(12) United States Patent
Chang et al.

(10) Patent No.: US 11,314,790 B2
(45) Date of Patent: Apr. 26, 2022

(54) DYNAMIC FIELD VALUE RECOMMENDATION METHODS AND SYSTEMS

(71) Applicant: salesforce.com, Inc., San Francisco, CA (US)

(72) Inventors: Son Thanh Chang, Oakland, CA (US); Weiping Peng, San Francisco, CA (US); Na Cheng, Dublin, CA (US); Feifei Jiang, San Mateo, CA (US); Jacob Nathaniel Huffman, Oakland, CA (US); Nandini Suresh Kumar, San Francisco, CA (US); Khoa Le, San Francisco, CA (US); Christopher Larry, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 15/929,364

(22) Filed: Apr. 28, 2020

(65) Prior Publication Data

US 2021/0149933 A1   May 20, 2021

Related U.S. Application Data

(60) Provisional application No. 62/936,980, filed on Nov. 18, 2019.

(51) Int. Cl.
*G06F 16/00* (2019.01)
*G06N 20/00* (2019.01)
(Continued)

(52) U.S. Cl.
CPC ...... *G06F 16/328* (2019.01); *G06F 16/24564* (2019.01); *G06F 16/24578* (2019.01);
(Continued)

(58) Field of Classification Search
CPC .. G06F 16/30; G06F 16/3347; G06F 16/3346; G06F 16/28; G06F 16/3329;
(Continued)

(56) References Cited

U.S. PATENT DOCUMENTS 5,577,188 A   11/1996   Zhu
5,608,872 A   3/1997   Schwartz et al.
(Continued)

FOREIGN PATENT DOCUMENTS

WO   WO2001055880 A1 *  8/2001
WO   WO2015094397 A1 *  6/2015
(Continued)

OTHER PUBLICATIONS

Tayfun Kucukyilmaz et al., "Chat mining: Predicting user and message attributes in computer-mediated communication", Information Processing and Management 44 (2008) pp. 1448-1466.*
(Continued)

*Primary Examiner* — Srirama Channavajjala
(74) *Attorney, Agent, or Firm* — LKGlobal | Lorenz & Kopf, LLP

(57) ABSTRACT

Computing systems, database systems, and related methods are provided for recommending values for fields of database objects and dynamically updating a recommended value for a field of a database record in response to updated auxiliary data associated with the database record. One method involves obtaining associated conversational data, segmenting the conversational data, converting each respective segment of conversational data into a numerical representation, generating a combined numerical representation of the conversational data based on the sequence of numerical representations using an aggregation model, generating the recommended value based on the combined numerical representation of the conversational data using a prediction
(Continued)

model associated with the field, and autopopulating the field of the case database object with the recommended value.

20 Claims, 10 Drawing Sheets

(51) Int. Cl.
  *G06F 16/31*  (2019.01)
  *G06F 16/35*  (2019.01)
  *G06F 16/34*  (2019.01)
  *H04L 51/56*  (2022.01)
  *G06F 16/2457*  (2019.01)
  *G06F 16/2455*  (2019.01)
  *G06F 16/9535*  (2019.01)

(52) U.S. Cl.
  CPC ............ *G06F 16/345* (2019.01); *G06F 16/35* (2019.01); *G06F 16/9535* (2019.01); *G06N 20/00* (2019.01); *H04L 51/36* (2013.01)

(58) Field of Classification Search
  CPC ........... G06F 16/24522; G06F 16/2237; G06F 16/9563; G06F 16/215; G06F 16/345; G06F 16/35; G06F 16/328; G06F 9/451; G06F 3/04847; G06F 3/0482; G06F 16/3331; G06F 16/951; G06F 16/24; G06F 16/564; G06F 16/9535; G06F 16/24578; G06N 20/00; G06N 5/04; G06N 5/048; G06N 5/025
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,621 B2 * | 9/2012 | Alewine ................ G10L 13/08 704/260 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,127,928 B2 * | 11/2018 | Gainsboro .......... H04M 3/2281 |
| 10,671,933 B2 * | 6/2020 | Dong ..................... G06N 20/00 |
| 10,977,258 B1 * | 4/2021 | Liu ........................ G06N 20/00 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |

(56) References Cited

U.S. PATENT DOCUMENTS

| | | |
|---|---|---|
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0154594 A1* | 6/2008 | Itoh .................. G10L 15/04 704/235 |
| 2008/0222531 A1* | 9/2008 | Davidson ........... G06Q 10/107 715/736 |
| 2008/0249972 A1 | 10/2008 | Dillon |
| 2008/0306899 A1* | 12/2008 | Gregory ............... G06F 16/345 |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0017483 A1* | 1/2010 | Estrada ............... G06Q 10/107 709/206 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah et al. |
| 2012/0233137 A1 | 9/2012 | Jakobson et al. |
| 2013/0103772 A1* | 4/2013 | Lau ..................... H04L 51/04 709/206 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246332 A1* | 9/2013 | Koister ............... G06F 16/9535 706/59 |
| 2013/0247216 A1 | 9/2013 | Cinarkaya et al. |
| 2014/0036022 A1* | 2/2014 | Croen .................. H04N 7/147 348/14.01 |
| 2016/0085726 A1* | 3/2016 | Bannister ............. G06F 3/0488 382/229 |
| 2016/0189047 A1* | 6/2016 | Meij .................... G06F 40/295 706/11 |
| 2016/0224524 A1* | 8/2016 | Kay ..................... G06F 3/0236 |
| 2016/0224803 A1* | 8/2016 | Frank ................. G06F 16/24578 |
| 2016/0350671 A1* | 12/2016 | Morris, II ............ G06N 20/00 |
| 2017/0116677 A1* | 4/2017 | Gray ................... G06Q 40/08 |
| 2017/0235735 A1* | 8/2017 | Ignatyev ............. G06N 5/047 706/12 |
| 2017/0262770 A1* | 9/2017 | Purdy ................... G06N 20/20 |
| 2018/0150783 A1* | 5/2018 | Xu ....................... G06N 20/00 |
| 2019/0103982 A1* | 4/2019 | Brunn .................. H04L 51/046 |
| 2019/0208032 A1* | 7/2019 | Sivasu ................. H04L 69/324 |
| 2019/0294676 A1* | 9/2019 | Sapugay .............. G06N 5/025 |
| 2020/0090651 A1* | 3/2020 | Tran ..................... G10L 15/16 |
| 2020/0097846 A1 | 3/2020 | Muramoto et al. |

FOREIGN PATENT DOCUMENTS

| | | |
|---|---|---|
| WO | WO2016025490 A1 * | 2/2016 |
| WO | WO2017132018 A1 * | 8/2017 |
| WO | WO 2019/209511 A1 * | 10/2019 |

OTHER PUBLICATIONS

Alexander Bartl et al., "A Retrieval-Based Dialogue System Utilizing Utterance and Context Embeddings", 16th IEEE International Conference on Machine Learning and Applications (ICMLA), Dec. 2017, pp. 1120-1125.*

H.H. Vilhjalmsson, "Augmenting Online Conversation through Automated Discourse Tagging", Proceedings of the 38th Annual Hawaii International Conference on System Sciences, Jan. 2005, pp. 1-10.*

* cited by examiner

500

| Conversation | Past Chats | Details |

Agent: Good afternoon! How are you doing?

Customer: I'm doing well. How are you?

Agent: I'm doing great. How may I help you today?

Customer: I'm on basic AT&T cable service right now, and I'm thinking of following the next NBA season. Also I'd like to watch the final season of Game of Thrones. What are my options?

Agent: I could certainly help you with that! Let me check... To subscribe to both programs next year, the best option would be to get the Live TV and HBO add ons. This package would cover all the sports program and Game of Thrones. The subscription cost is an additional 29.99 per month.

Customer: Ok thanks. That's more than I thought. Is there any discount?

Agent: Yes! As a matter of fact, because this would be the first time that you choose these add-ons, you get the new sign-up discount. That would bring down your subscription cost to 19.99 per month. Would that work?

Customer: That sounds like a deal. I'll get it.

 End Chat

Type a Message...

FIG. 5

DYNAMIC FIELD VALUE RECOMMENDATION METHODS AND SYSTEMS

CROSS-REFERENCE TO RELATED APPLICATION

This application claims the benefit of U.S. Provisional Patent Application Ser. No. 62/936,980, filed Nov. 18, 2019, the contents of which are incorporated by reference herein in its entirety.

TECHNICAL FIELD

Embodiments of the subject matter described herein relate generally to computer systems, and more particularly to the prediction of field values for fields in a form on a computer system.

BACKGROUND

Many forms are filled out via computer systems. The forms may be configured to capture information about some other document, file, observation, and others. The forms may exist on computer systems and may be generated by application programs on a computer system. A system that could analyze the document, file, observation, etc. that the form is configured to capture information regarding would be advantageous and could improve production and reduce manual workload.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 depicts an exemplary chat messaging graphical user interface (GUI) display for a chat messaging session that may be presented in connection with the subject matter described herein in accordance with one or more embodiments;

DETAILED DESCRIPTION

Figure 1:
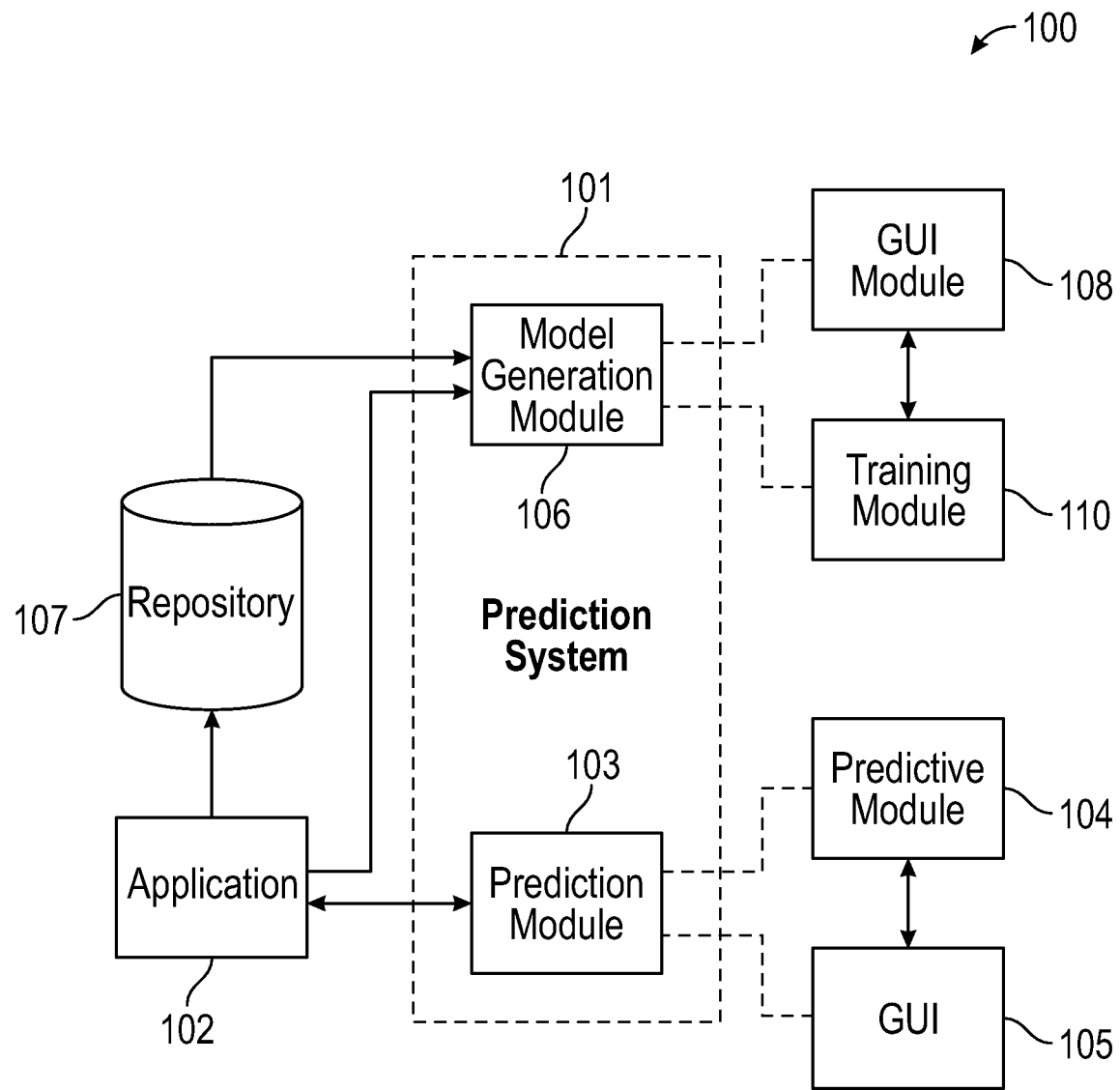
FIG. 1 is a block diagram depicting an example computing environment that can be used to implement aspects of the current subject matter, in accordance with one or more embodiments.

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Disclosed herein are systems, apparatus, methods and techniques for predicting field values for preselected fields based on confidence levels in an analyzed dataset. In one example, a predictive model is trained using a pre-existing data set to predict field values for preselected fields from objects contained in the data set. A confidence function is calculated for the preselected fields. In operation with a new object, the predictive model may predict field values for the preselected fields and a confidence level for the predictions. When a prediction has a confidence level that meets or exceeds a confidence level threshold, the predictive model may designate the prediction as a recommended field value.

As described in greater detail below in the context of FIGS. 5-10, in one or more exemplary embodiments, a predictive model is utilized to generate recommended field values for an unstructured field of a database record based on auxiliary data associated with the database record and auto-populating the unstructured field of the database record with its respective recommended field value. The auxiliary data may include conversational data associated with the database record, such as, for example, e-mails, text messages, online chat messages, web feeds, or other conversational data associated with or otherwise related to the database record. In exemplary embodiments, the conversational data associated with a database record is divided or otherwise segmented into a sequence of multiple different segments (e.g., by dividing a chat message into individual utterances by individual parties) that, when put back together, would reconstitute the original conversational data. The textual data that makes up each conversational segment is input or otherwise provided to an encoder model that generates or otherwise converts the respective conversational segment to a corresponding numerical representation as a function of the textual data. In this regard, the encoder model may be derived using machine learning or other artificial intelligence techniques to develop an equation or formula for calculating a numerical value as a function of an input segment of text based on historical relationships between segments of conversational data. For example, the reference inputs to the encoder model may be a numeric representation of the sequence of words in the conversation, where a numerical value is generated for each word in the sequence. The numerical representation for each word may be generated and assigned randomly, or alternatively, may be generated and assigned using another machine learning model (e.g., Global Vectors (GloVe) or a similar machine learning model). In this regard, each segment of a conversational sequence may be converted into a numerical vector representation. The encoder model is then trained to convert an input vector for a respective conversational segment into an aggregate numerical representation of the respective conversational segment. It should be noted that depending on the embodiment and the performance of a particular type of model or modeling technique, the encoder model may be developed in a field-specific manner (e.g., augmented or trained with respect to the field to be predicted) or in a nonspecific manner, in which case the encoder model may be used to facilitate predictions for more than one field, as depicted in FIG. 10.

Converting conversational segments within a conversational sequence results in a sequence of numerical values that corresponds to the sequence of conversational segments that makes up the conversational data associated with the database record. That is to say, the numerical sequence reflects both the content and the temporal relationships among discrete components of the conversational data. The numerical sequence is input or otherwise provided to a model that generates or otherwise converts the sequence of numerical values into a combined numerical representation of the entire sequence of conversational data as a function of the input numerical sequence, which is then mapped to a probable field value. For example, a characterization model may function as a classifier that converts an input numerical sequence into a probable value for a particular field of the database record. For example, in one embodiment, the characterization model is configured to generate a summary of the conversational data by mapping an input numerical sequence to a probable summarization of the essence of the conversation. Similar to the encoder model, a summarization model may be derived using machine learning or other artificial intelligence techniques to develop an equation or formula for calculating a textual or numerical value as a function of an input numerical sequence based on historical relationships between numerical sequences and corresponding manually created values for a summary field. In this regard, based on relationships between historical values that were manually input or otherwise provided for an unstructured field associated with respective data records and corresponding numerical sequences for the conversational data associated with the respective data records, a summarization model may be derived for automatically generating summarization data for the unstructured field as a function of an input numerical sequence.

In other embodiments, the characterization model may be a classification model that generates a classification value or class value by mapping an input numerical sequence to one of a plurality of potential values for a field. In this regard, the characterization model may generate predicted or recommended values for a structured field associated with the data record based on the conversational data associated with the data record. For example, a classification model may be derived using machine learning or other artificial intelligence techniques to develop an equation or formula for assigning a classification value or state as a function of an input numerical sequence based on historical relationships between numerical sequences and corresponding assigned values for that particular field associated with the data record. In this regard, based on relationships between historical values that were manually selected or otherwise provided for a structured field associated with respective data records and corresponding numerical sequences for the conversational data associated with the respective data records, a classification model may be derived for automatically generating a predicted value for the structured field as a function of an input numerical sequence.

Field Prediction Overview

FIG. 1 is a block diagram depicting an example computing system 100 that can implement aspects of the described systems, apparatus, methods and techniques. The example computing system 100 includes a prediction system 101 and an application 102 such as a customer relationship management (CRM) application. The example CRM application 102 is configured for use in creating a form that can be used to capture information regarding customer objects and contacts. An object may be any number of data items such as an object from a customer, an object about a customer, and others. The example CRM application 102 is connected to a repository 107 containing a pre-existing, user provided data set of objects.

The example prediction system 101 includes a prediction module 103 and a model generation module 106. The example prediction module 103 includes a predictive model 104 and a GUI module 105. The example predictive model 104 is configured to analyze a new object received by the example CRM application 102, predict a likely field value for one or more user selected fields within the form generated by the example CRM application 102 based on the object analysis, provide the predicted field values to the example CRM application 102, and calculate a predicted confidence level for each predicted field value. The example model generation module 106 is configured to train the predictive model 104 using machine learning techniques and in accordance with user selected preferences.

The example prediction system 101 is implemented by a controller. The controller includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in implementing the example prediction system 101.

The instructions may include one or more separate programs, each of which comprises an ordered listing of executable instructions for implementing logical functions. The instructions, when executed by the processor, receive and process data, perform logic, calculations, methods and/or algorithms for implementing the example prediction system 101.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

The example model generation module 106 includes a GUI module 108 and a training module 110. The example GUI module 108 is configured to provide a user interface for user selection of options for operation of the prediction module 103. The example training module 110 is configured to train the predictive model 104 using reinforced learning and/or other machine learning techniques.

The example GUI module 108 is configured to provide a user interface for user selection of the one or more user selected fields within the example CRM application 102. The user is provided a user interface that allows the user to indicate a desire to select one or more fields within the example CRM application for which predicted field values will be provided.

The example training module 110 in the example model generation module 106 is configured to train the prediction model 104 after user selection of fields for prediction. To train the predictive model 104, the example training module 110 is configured to analyze the pre-existing, user provided data set of objects in the repository 107 for relationships between the user selected fields and content in the objects in the data set (e.g., content in the title and body of message objects). The example training module 106 is configured to train, based on the analysis, the predictive model 104 to predict field values and a confidence level for the prediction.

During the training phase, the example training module 110 is also configured to determine, for each user selected field based on the analysis, a confidence function for the predictive model 104. The example training module 110 is configured to determine the confidence function by testing the accuracy of predictions from the predictive model 104. The example confidence function identifies the percentage of field values for a field that were predicted correctly by the trained predictive model 104 at different applied confidence levels, the percentage of field values for the field that were predicted incorrectly by the trained predictive model 104 at different applied confidence levels, and the percentage of instances for a field in which the trained predictive model 104 could not provide a prediction at different applied confidence levels.

The example GUI module 108 may be configured to provide a user interface for user review of the confidence function for a user selected field and for user selection of a confidence threshold level to be used with the predictive model 104 for the user selected field. For example, a GUI may include a user selectable button that allows a user to instruct the example model generation module 106 to allow the user to review the confidence function for a user selected field and to select a confidence threshold level to be used with the predicting model 104 for the user selected field. For example, at a 60% confidence level the predictive model 104 is expected to correctly predict the field value for the user selected field 97% of the time based on the performance of the predictive model on the training data set. At the 60% confidence level, the predictive model 104 is expected to incorrectly predict the field value for the user selected field 3% of the time based on the performance of the predictive model on the training data set. At the 60% confidence level, the predictive model 104 is expected to not provide a prediction at different applied confidence levels 0% of the time based on the performance of the predictive model on the training data set. The example model generation module 106 may be configured to select an optimal confidence threshold level and/or allow the user to alter the confidence threshold level.

The example model generation module 106 is also configured to provide, for user selection via the user interface, an option for the predictive model 104 to identify a predicted field value as a best recommendation. The confidence threshold level is used to determine the best recommendation, wherein predicted field values determined by the predictive model 104 that have an associated confidence level that is below the confidence threshold level will not be recommended as a best recommendation. Predicted field values determined by the predictive model 104 that have an associated confidence level that is equal to or above the confidence threshold level can be recommended by the predictive model 104 as a best recommendation via a visual indication. The model generation module 106 may also be configured to provide an option, for user selection via the user interface, for the predictive model 104 to automatically apply the best recommendation as a field value without user confirmation of the application of the best recommendation as a field value.

The example model generation module 106 may be configured to provide an option, via the user interface, to activate the prediction module 103 for use with the example CRM application 102. When activated for use with the example CRM application 102 and the example CRM application 102 receives a new object, the example predictive model 104 is utilized to predict field values for the user selected fields based on content in the new object. Depending on the embodiment, the GUI module 105 may be configured to automatically enter predicted field values in user selected fields or alternatively present the user with predicted field value options as recommendations for selection or entry.

Figure 2:
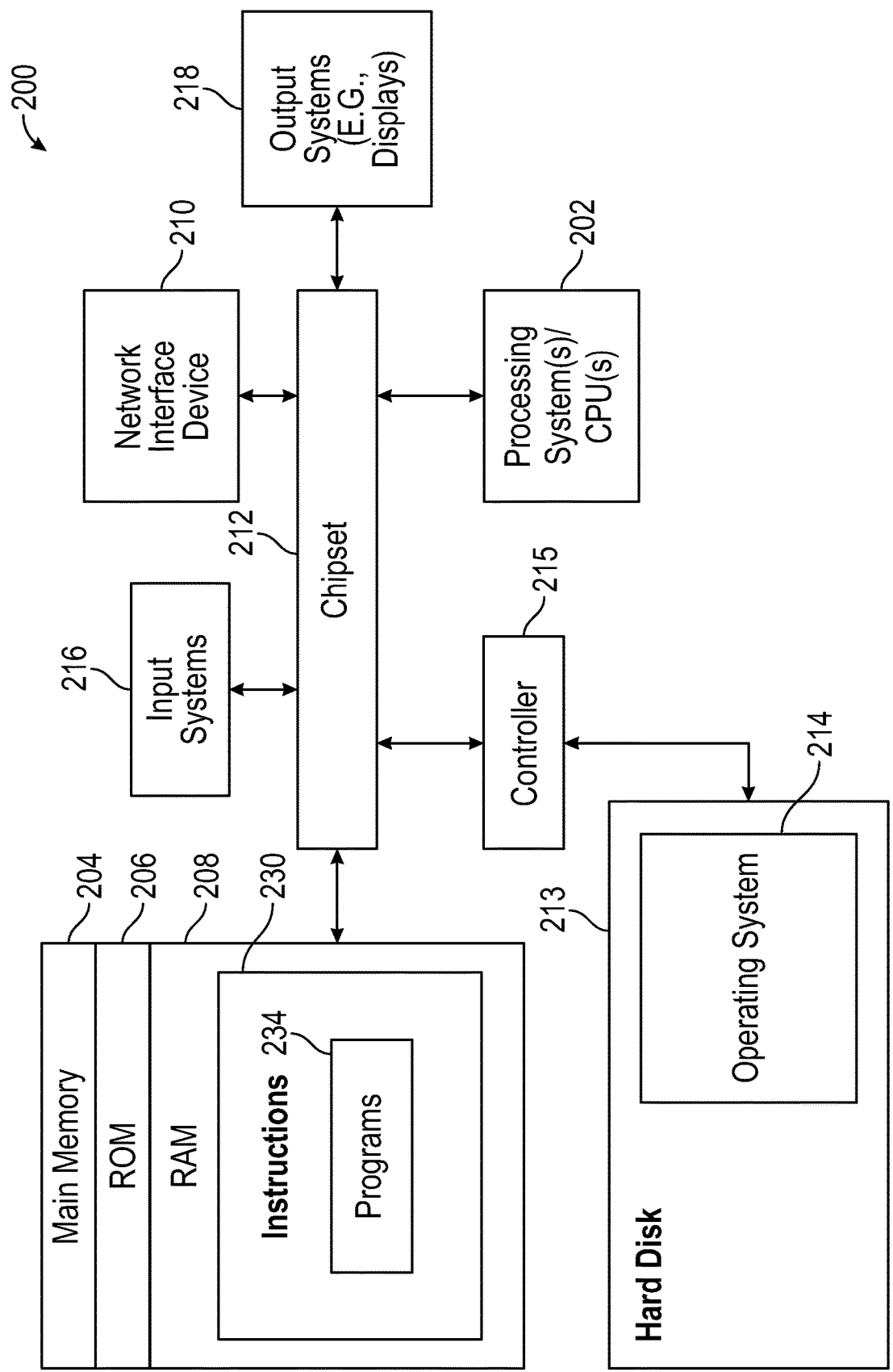
FIG. 2 is a schematic block diagram of an example computer system that can be used to implement the techniques and methods described herein, in accordance with one or more embodiments.

FIG. 2 is a schematic block diagram of an example computer system that can be used to implement the techniques and methods described herein. The example computer system can include one or more processing system(s) 202, main memory 204, a network interface device (NID) 210, a chipset 212, a hard disk 213 and hard disk controller 215, input systems 216, and output systems 218.

The chipset 212 is usually located on a motherboard and is a set of electronic components (e.g., in an integrated circuit) that interconnects and manages the data flow between the processing system(s) 202 and other elements of the computer system and connected peripherals. For instance, the chipset 212 provides an interface between the processing system(s) 202 and the main memory 204, and also includes functionality for providing network connectivity through the NID 210, such as a gigabit Ethernet adapter. The chipset 212 typically contains the processor bus interface (also known as a front-side bus), memory controllers, bus controllers, I/O controllers, etc.

Processing system(s) 202 represents one or more general-purpose processing devices such as a microprocessor, central processing unit, or the like. More particularly, the processing system(s) 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 202 may also be one or more special-purpose processing devices such as an application specific integrated circuit (ASIC), a field programmable gate array (FPGA), a digital signal processor (DSP), network processor, or the like.

The processing system(s) 202 can include one or more central processing units (CPUs) that operate in conjunction with the chipset 212. The processing system(s) 202 perform arithmetic and logical operations necessary for the operation of the example computer system.

The NID 210 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 216 (or input device(s)) allow a user to input information to the computer system and can include things such as a keyboard, a mouse or other cursor pointing device, a pen, a voice input device, a touch input device, a webcam device, a microphone, etc. Output system(s) 218 (or output device(s)) present information to the user of the computer system and can include things such as a display, monitor, speakers, or the like.

The chipset 212 can provide an interface to various forms of computer-readable storage media including a main memory 204 (e.g., read-only memory (ROM), flash memory, dynamic random access memory (DRAM) such as synchronous DRAM (SDRAM)), and hard disk 213. The processing system(s) 202 can communicate with the various forms of computer-readable storage media via the chipset 212 and appropriate buses.

A hard disk 213 is a form of non-volatile memory that can store an operating system (OS) 214. The operating system 214 is software that is copied into RAM and executed by the processing system(s) 202 to control the operation of the example computer system, manage computer hardware and software resources, and provide common services for computer programs executed by the processing system(s) 202. Regardless of the implementation, the operating system 214 includes many different "components" that make the different parts of the example computer system work together. The disk controller 215 is the controller circuit which enables the processing system 202 to communicate with a hard disk 213, and provides an interface between the hard disk 213 and the bus connecting it to the rest of the system.

The main memory 204 may be composed of many different types of memory components. The main memory 204 can include non-volatile memory (such as read-only memory (ROM) 206, flash memory, etc.), volatile memory (such as random access memory (RAM) 208), or some combination of the two. The RAM 208 can be any type of suitable random access memory including the various types of dynamic random access memory (DRAM) such as SDRAM, the various types of static RAM (SRAM). The main memory 204 (as well as the processing system(s) 202) may be distributed throughout the example computer system.

The ROM 206 of the main memory 204 can be used to store firmware that includes program code containing the basic routines that help to start up the example computer system and to transfer information between elements within the example computer system. The ROM of the main memory 204 may also store other software components necessary for the operation of the example computer system.

The RAM 208 stores programs/instructions 230 or executable code for one or more programs 234 that can be loaded and executed at processing system(s) 202 to perform various functions. The programs/instructions 230 are computer readable program code that can be stored in RAM 208 (or other a non-transitory computer readable medium of the example computer system) that can be read and executed by processing system(s) 202 to perform various acts, tasks, functions, and steps as described herein. The methods and techniques described herein can be captured in programming instructions 230 for execution by the processing system 202 to cause the example computer system to perform the described methods, processes, and techniques.

Chat Messaging Overview

A chat messaging interface is a graphical element provided by a GUI or other presentation interface that enables a user to communicate with another chat participant. Typically, a chat messaging interface is implemented as a widget or window-inside-browser-window that is smaller than the browser tab or browser window. That said, the subject matter described herein is not limited to web browsers, and may be implemented in an equivalent manner in the context of other local client applications, on-demand applications, and/or the like. The chat messaging interface is configured to present user-entered communications and communications received by the client device and directed to the user from other chat participants.

Figure 3:
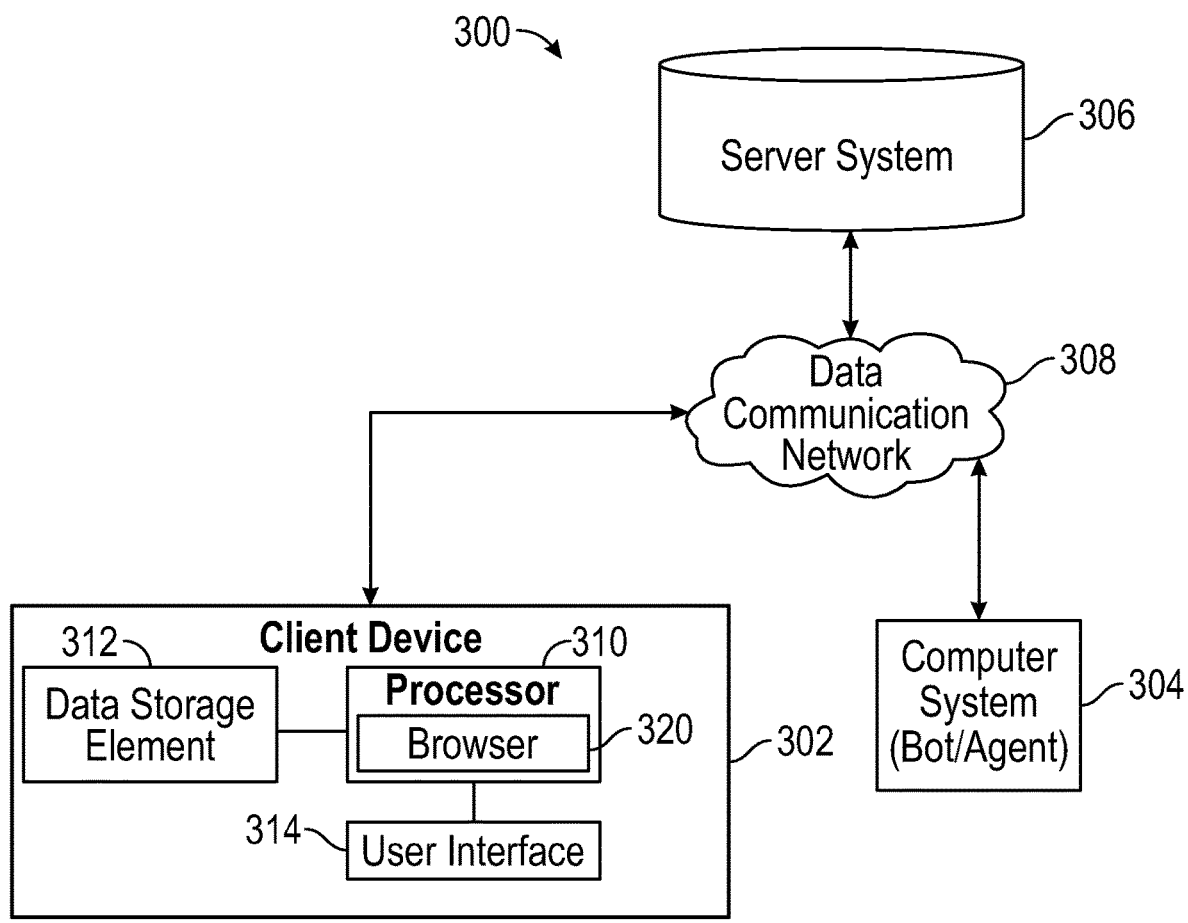
FIG. 3 is a block diagram of a system for providing communication sessions over a network in accordance with one or more embodiments.

FIG. 3 depicts a block diagram of a system 300 for providing browser-based, communication session continuity for rendering conversation content via a messaging application for a browser-based presentation interface. As shown, the system 300 includes a client device 302 for operation by a user. The client device 302 may be implemented using a standalone personal computer, a portable computer (e.g., a laptop, a tablet computer, or a handheld computing device), a computer integrated into another device or system (e.g., a "smart" television, a smartphone, or a smartwatch), or any other device or platform including at least one processor 310, a data storage element 312 (or memory), and a user interface 314 to allow a user to interact with the client device 302. The user interface 314 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 302.

In the illustrated embodiment, the client device 302 is capable of communicating with a remote server system 306 via a data communication network 308. The data communication network 308 may be any digital or other communications network capable of transmitting messages or data between devices, systems, or components. In certain embodiments, the data communication network 308 includes a packet switched network that facilitates packet-based data communication, addressing, and data routing. The packet switched network could be, for example, a wide area network, the Internet, or the like. In various embodiments, the data communication network 308 includes any number of public or private data connections, links or network connections supporting any number of communications protocols. The data communication network 308 may include the Internet, for example, or any other network based upon TCP/IP or other conventional protocols. In various embodiments, the data communication network 308 could also incorporate a wireless and/or wired telephone network, such as a cellular communications network for communicating with mobile phones, personal digital assistants, and/or the like. The data communication network 308 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 306 may include one or more remotely located servers, and the server system 306 provides data for presentation via the browser application 320 that is stored, maintained, executed, or otherwise supported by the client device 302. The server system 306 may provide internet-based data, intranet-based data, chat or messaging application data, communication session identifiers or other connection data, and any applicable data originating from a potential secondary computer system 304. The server system 306 may include any number of application servers, and each server may be implemented using any suitable computer. In some embodiments, the server system 306 includes one or more dedicated computers. In some embodiments, the server system 306 includes one or more computers carrying out other functionality in addition to server operations. In exemplary embodiments, the server system 306 operates within a client-server architecture, executing programs to serve the requests of other programs (e.g., a browser application 320 executed by the client device 302).

One or more application servers of the server system 306 maintains and provides web-based data which enables users to interact over the Internet or an intranet. The client device 302 interacts with the server system 306 in such a way that the client device 302 provides data communications to the server system 306 and receives data communications from the server system 306. In certain embodiments, the server system 306 may act as an intermediary for a chat messaging session between the client device 302 and another computer system 304, wherein the server system 306 receives data communications from the computer system 304 that are directed to the client device 302, wherein the server system 306 receives computer system 304 data communications and the server system 306 then forwards the computer system 304 data communications to the client device 302 as part of a particular functionality of a browser application that is maintained, executed, and utilized via the client device 302. For example, when the client device 302 initiates a chat application or messaging application via the browser application, the computer system 304 may be operated by a customer service agent or other chat participant communicating with the user of the client device 302 via the chat messaging application. However, in the illustrated embodiment, the computer system 304 does not communicate with the client device 302 directly. Instead, the server system 306 provides chat messaging application data, including functionality associated with the chat messaging application itself, and also including transmitted messages from the agent using the computer system 304 which have been sent to the server system 306 first and then forwarded as part of the chat messaging application data communications transmitted to the client device 302 throughout the duration of the chat messaging session.

During typical operation, the client device 302 executes a browser application 320 that presents a GUI display for the browser application, with the browser application 320 being utilized to establish a communication session with the server system 306 to exchange communications between the client device 302 and the server system 306 (e.g., by a user inputting a network address for the server system 306 via the GUI display of the browser application). The GUI display may be realized as a browser tab or browser window that provides a corresponding chat messaging interface or "chat window" through which a user can exchange chat messages with other parties. The user of the client device 302 can use the chat messaging interface to exchange messages with a live agent operator of the computer system 304, where the computer system 304 is realized as another instance of the client device 302 that is utilized by another human user in an equivalent manner as the client device 302. Alternatively, the computer system 304 could be configured to support or otherwise provide an automated agent (e.g., a "chat-bot") configured to exchange chat messages with users originating from the computer system 304 or the server system 306. Chat messages exchanged via the chat messaging interface may include text-based messages that include plain-text words only, and/or rich content messages that include graphical elements, enhanced formatting, interactive functionality, or the like.

In one or more embodiments, the data storage element 312 stores or otherwise maintains chat messaging data using a storage format and storage location such that the chat messaging data may be later retrieved for use. For example, text-based chat messages that are presented in a plain-text format may be stored or otherwise maintained in a string format. In some embodiments, rich content chat messages may also be locally stored by the browser application, for example, as JavaScript Object Notation (JSON) objects. The chat messaging data may be analyzed at the client device 302 and/or the computer system 304 upon termination of a chat messaging session, or the chat messaging data may be uploaded or otherwise transmitted from the client device 302 and/or the computer system 304 for analysis at the server system 306.

Multi-Tenancy

Figure 4:
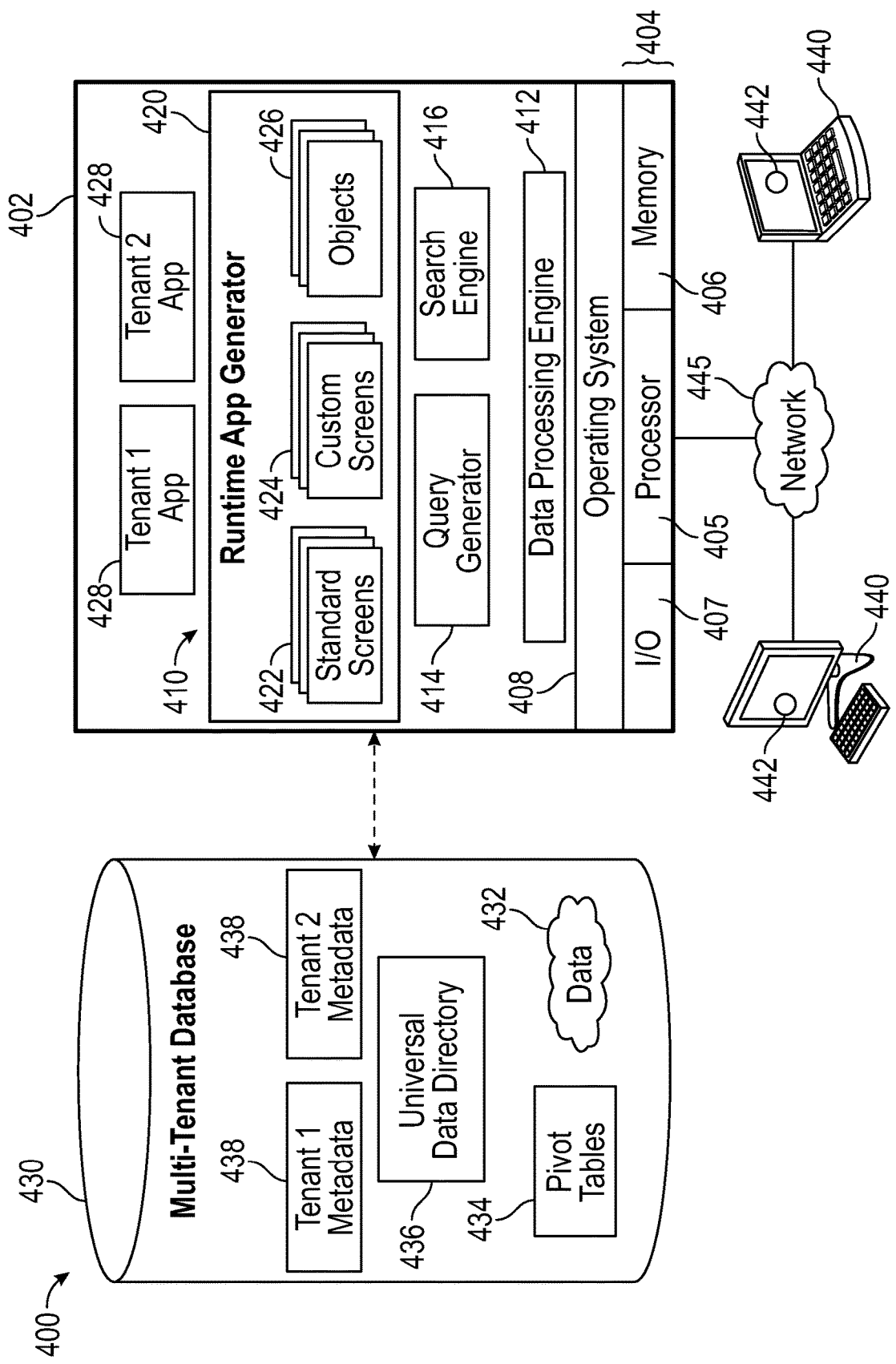
FIG. 4 is a block diagram of an exemplary multi-tenant database system suitable for use with the system of FIG. 1 and/or the system of FIG. 3 in accordance with one or more embodiments.

FIG. 4 is a block diagram of an exemplary multi-tenant database system 400 suitable for use with one or more of the systems 300, 300 described above, in accordance with the disclosed embodiments. The illustrated multi-tenant database system 400 of FIG. 4 includes a server 402 (e.g., server system 306) that dynamically creates and supports virtual applications 428 based upon data 432 from a common database 430 that is shared between multiple tenants, alternatively referred to herein as a multi-tenant database. Data and services generated by the virtual applications 428 are provided via a network 445 (e.g., data communication network 308) to any number of client devices 440 (e.g., client device 302, live agent computer system 304, or the like), as desired. Each virtual application 428 is suitably generated at run-time (or on-demand) using a common application platform 410 that securely provides access to the data 432 in the database 430 for each of the various tenants subscribing to the multi-tenant system 400. In one or more embodiments, the subject matter described herein is implemented in the context of the multi-tenant database system 400, where the chat messaging widgets are integrated with or otherwise provided within instances of one or more virtual applications 428 generated by the server 402.

In accordance with one non-limiting example, the multi-tenant system 400 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 430. In this regard, each tenant includes one or more users associated with, assigned to, or otherwise belonging to that respective tenant. To put it another way, each respective user within the multi-tenant system 400 is associated with, assigned to, or otherwise belongs to a particular tenant of the plurality of tenants supported by the multi-tenant system 400. Tenants may represent customers, customer departments, business or legal organizations, and/or any other entities that maintain data for particular sets of users within the multi-tenant system 400 (i.e., in the multi-tenant database 430). For example, the application server 402 may be associated with one or more tenants supported by the multi-tenant system 400. Although multiple tenants may share access to the server 402 and the database 430, the particular data and services provided from the server 402 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 432 belonging to or otherwise associated with other tenants.

The multi-tenant database 430 is any sort of repository or other data storage system capable of storing and managing the data 432 associated with any number of tenants. The database 430 may be implemented using any type of conventional database server hardware. In various embodiments, the database 430 shares processing hardware 404 with the server 402. In other embodiments, the database 430 is implemented using separate physical and/or virtual database server hardware that communicates with the server 402 to perform the various functions described herein. In an exemplary embodiment, the database 430 includes a database management system or other equivalent software capable of determining an optimal query plan for retrieving and providing a particular subset of the data 432 to an instance of virtual application 428 in response to a query initiated or otherwise provided by a virtual application 428. The multi-tenant database 430 may alternatively be referred to herein as an on-demand database, in that the multi-tenant database 430 provides (or is available to provide) data at run-time to on-demand virtual applications 428 generated by the application platform 410.

In practice, the data 432 may be organized and formatted in any manner to support the application platform 410. In various embodiments, the data 432 is suitably organized into a relatively small number of large data tables to maintain a semi-amorphous "heap"-type format. The data 432 can then be organized as needed for a particular virtual application 428. In various embodiments, conventional data relationships are established using any number of pivot tables 434 that establish indexing, uniqueness, relationships between entities, and/or other aspects of conventional database organization as desired. Further data manipulation and report formatting is generally performed at run-time using a variety of metadata constructs. Metadata within a universal data directory (UDD) 436, for example, can be used to describe any number of forms, reports, workflows, user access privileges, business logic and other constructs that are common to multiple tenants. Tenant-specific formatting, functions and other constructs may be maintained as tenant-specific metadata 438 for each tenant, as desired. Rather than forcing the data 432 into an inflexible global structure that is common to all tenants and applications, the database 430 is organized to be relatively amorphous, with the pivot tables 434 and the metadata 438 providing additional structure on an as-needed basis. To that end, the application platform 410 suitably uses the pivot tables 434 and/or the metadata 438 to generate "virtual" components of the virtual applications 428 to logically obtain, process, and present the relatively amorphous data 432 from the database 430.

The server 402 is implemented using one or more actual and/or virtual computing systems that collectively provide the dynamic application platform 410 for generating the virtual applications 428. For example, the server 402 may be implemented using a cluster of actual and/or virtual servers operating in conjunction with each other, typically in association with conventional network communications, cluster management, load balancing and other features as appropriate. The server 402 operates with any sort of conventional processing hardware 404, such as a processor 405, memory 406, input/output features 407 and the like. The input/output features 407 generally represent the interface(s) to networks (e.g., to the network 445, or any other local area, wide area or other network), mass storage, display devices, data entry devices and/or the like. The processor 405 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 406 represents any non-transitory short or long term storage or other computer-readable media capable of storing programming instructions for execution on the processor 405, including any sort of random access memory (RAM), read only memory (ROM), flash memory, magnetic or optical mass storage, and/or the like. The computer-executable programming instructions, when read and executed by the server 402 and/or processor 405, cause the server 402 and/or processor 405 to create, generate, or otherwise facilitate the application platform 410 and/or virtual applications 428 and perform one or more additional tasks, operations, functions, and/or processes described herein. It should be noted that the memory 406 represents one suitable implementation of such computer-readable media, and alternatively or additionally, the server 402 could receive and cooperate with external computer-readable media that is realized as a portable or mobile component or application platform, e.g., a portable hard drive, a USB flash drive, an optical disc, or the like.

The application platform 410 is any sort of software application or other data processing engine that generates the virtual applications 428 that provide data and/or services to the client devices 440. In a typical embodiment, the application platform 410 gains access to processing resources, communications interfaces and other features of the processing hardware 404 using any sort of conventional or proprietary operating system 408. The virtual applications 428 are typically generated at run-time in response to input received from the client devices 440. For the illustrated embodiment, the application platform 410 includes a bulk data processing engine 412, a query generator 414, a search engine 416 that provides text indexing and other search functionality, and a runtime application generator 420. Each of these features may be implemented as a separate process or other module, and many equivalent embodiments could include different and/or additional features, components or other modules as desired.

The runtime application generator 420 dynamically builds and executes the virtual applications 428 in response to specific requests received from the client devices 440. The virtual applications 428 are typically constructed in accordance with the tenant-specific metadata 438, which describes the particular tables, reports, interfaces and/or other features of the particular application 428. In various embodiments, each virtual application 428 generates dynamic web content that can be served to a browser or other client program 442 associated with its client device 440, as appropriate.

The runtime application generator 420 suitably interacts with the query generator 414 to efficiently obtain multi-tenant data 432 from the database 430 as needed in response to input queries initiated or otherwise provided by users of the client devices 440. In a typical embodiment, the query generator 414 considers the identity of the user requesting a particular function (along with the user's associated tenant), and then builds and executes queries to the database 430 using system-wide metadata 436, tenant specific metadata 438, pivot tables 434, and/or any other available resources. The query generator 414 in this example therefore maintains security of the common database 430 by ensuring that queries are consistent with access privileges granted to the user and/or tenant that initiated the request. In this manner, the query generator 414 suitably obtains requested subsets of data 432 accessible to a user and/or tenant from the database 430 as needed to populate the tables, reports or other features of the particular virtual application 428 for that user and/or tenant.

Each database 430 can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems 400, standard entity tables might be provided for use by all tenants. For CRM database applications, such standard entities might include tables for Account, Contact, Lead, and Opportunity data, each containing predefined fields. It should be understood that the word "entity" may also be used interchangeably herein with "object" and "table."

In some multi-tenant database systems 400, tenants may be allowed to create and store custom objects, or they may be allowed to customize standard entities or objects, for example by creating custom fields for standard objects, including custom index fields. U.S. Pat. No. 4,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system 400. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Still referring to FIG. 4, the data processing engine 412 performs bulk processing operations on the data 432 such as uploads or downloads, updates, online transaction processing, and/or the like. In many embodiments, less urgent bulk processing of the data 432 can be scheduled to occur as processing resources become available, thereby giving priority to more urgent data processing by the query generator 414, the search engine 416, the virtual applications 428, etc.

In exemplary embodiments, the application platform 410 is utilized to create and/or generate data-driven virtual applications 428 for the tenants that they support. Such virtual applications 428 may make use of interface features such as custom (or tenant-specific) screens 424, standard (or universal) screens 422 or the like. Any number of custom and/or standard objects 426 may also be available for integration into tenant-developed virtual applications 428. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 426 such as "account" objects, "opportunity" objects, "contact" objects, or the like. The data 432 associated with each virtual application 428 is provided to the database 430, as appropriate, and stored until it is requested or is otherwise needed, along with the metadata 438 that describes the particular features (e.g., reports, tables, functions, objects, fields, formulas, code, etc.) of that particular virtual application 428. For example, a virtual application 428 may include a number of objects 426 accessible to a tenant, wherein for each object 426 accessible to the tenant, information pertaining to its object type along with values for various fields associated with that respective object type are maintained as metadata 438 in the database 430. In this regard, the object type defines the structure (e.g., the formatting, functions and other constructs) of each respective object 426 and the various fields associated therewith.

Still referring to FIG. 4, the data and services provided by the server 402 can be retrieved using any sort of personal computer, mobile telephone, tablet or other network-enabled client device 440 on the network 445. In an exemplary embodiment, the client device 440 includes a display device, such as a monitor, screen, or another conventional electronic display capable of graphically presenting data and/or information retrieved from the multi-tenant database 430. Typically, the user operates a conventional browser application or other client program 442 executed by the client device 440 to contact the server 402 via the network 445 using a networking protocol, such as the hypertext transport protocol (HTTP) or the like. The user typically authenticates his or her identity to the server 402 to obtain a session identifier ("SessionID") that identifies the user in subsequent communications with the server 402. When the identified user requests access to a virtual application 428, the runtime application generator 420 suitably creates the application at run time based upon the metadata 438, as appropriate. As noted above, the virtual application 428 may contain Java, ActiveX, or other content that can be presented using conventional client software running on the client device 440; other embodiments may simply provide dynamic web or other content that can be presented and viewed by the user, as desired.

Case Wrap-Up

In exemplary embodiments, a case database object is utilized to track issues and resolutions across different cases. For example, in a CRM application, an instance of a case database object (alternatively referred to herein as a case database record) may be associated with a question, feedback, or other issue received from a customer. Case database objects could be created or otherwise instantiated in numerous different ways, for example, via online forums, emails (e.g., Email-to-Case), websites (e.g., Web-to-Case), call centers, and/or the like. When a case is created or otherwise received, a corresponding case database record is created that includes fields maintaining basic information associated with the case, such as, for example, a case identifier (or case ID), a case description, a source or origin of the case, and/or the like. During the lifecycle of the case, values for other fields of a case database record may be modified, such as, for example, by a customer service agent or other user or algorithm inputting, populating, or otherwise providing values for a case reason, a case type, a case priority, and/or other fields associated with the case database record (where the fields of the case database record may vary with respect to the particular tenant in a multi-tenant embodiment). For example, a customer service agent can triage and classify the case by assigning categorical values to the various case fields. Since manual processing can be time consuming, some embodiments may employ a case classification system or other algorithms to automatically classify or otherwise recommend or predict values for various case fields based on existing values for other case fields (e.g., the case subject and description fields). Examples of such automated classification, prediction and recommendation techniques are described in U.S. patent application Ser. No. 16/198,449, filed Nov. 21, 2018.

Although automated case classification can achieve adequate performance, some shortcomings remain. For example, the algorithms may rely on case fields that are populated when the case is first created or instantiated and do not capture, reflect, or otherwise account for useful information obtained during the later stages of a case's lifecycle. For example, service agent may add case comments and feeds after a case is created to resolve issues associated with the case. The data in the fields associated with a case also may not contain all the information regarding case resolution or root cause(s). Moreover, the related data or information such as case feeds, comments, e-mail threads, and the like often contain relatively large amounts of text and noise (e.g., non-pertinent information). Thus, even with the existing automated classification techniques, it may still require an undesirably long amount of time for service agents to analyze and process a case to its conclusion.

To overcome such shortcomings, embodiments described herein provide a so-called "smart" case management system and method (alternatively referred to herein as the Case Wrap-up process) that uses the following data as input: basic case information, such as case subject and description and potentially other case fields; auxiliary data generated during the life cycle of a case, e.g., agent comments, feeds, and live chats, and the like; and knowledge articles related to a case. Because a case may not have an explicit association to knowledge articles, a recommended article from a case-article recommender may automatically be assigned or otherwise designated as a related article. Language models are applied to convert input text to predictions. The language models are modified to accommodate processing long text, since some language models become ineffective when the input text is too long while others have constraints on max sequence length. Long text is divided into smaller chunks, and each chunk is fed into an encoder to obtain an encoded numerical representation. The final embeddings are combined via various techniques (e.g., mean pooling, max pooling, feed forward neural network) to obtain an aggregated numerical representation before it is fed to a classifier. Additionally, this system provides automatic summarization of different types of case text to assist and speed up case resolution. In exemplary embodiments, both supervised and unsupervised text summarization techniques are utilized to categorize the summarization into at least one of "issue" and "suggested solutions" categories.

In exemplary embodiments, when a case database record is updated (e.g., a new piece of feed or comment is added, or a new knowledge article is generated), that case is re-analyzed and re-classified to generate new predictions or recommendations for case fields. If a new prediction is different from previous prediction, a rule-based checker compares the new prediction with the old one and decides which one is to be recommended.

During a typical manual wrap-up stage of a case's lifecycle, an agent summarizes pertinent details about a case and the actions taken to resolve an issue to package all the information that was generated from the agent-customer interaction to ensure that the requisite details about an issue and its resolution are continually up-to-date as multiple agents interact with the case. During the agent-customer interaction, the agent collects customer information, populates case details, and attaches relevant supplements (e.g., documents, articles, tasks) based on back-and-forth with the customer. During the typical manual wrap-up stage, the agent seeks to log/update pertinent details or supplements for the case qualified from the customer interaction as well as the past or future steps toward solving the issue. The eventual goal is to resolve the case and close it, but when this cannot be done after a single conversation, wrap-up helps bridge the information gap between multiple agents and customer interactions.

In exemplary embodiments described herein, the Case Wrap-up process utilizes machine learning or other artificial intelligence to shorten the time it takes a customer service agent to wrap-up or summarize pertinent information gathered during the lifecycle of a case by providing field value recommendations on the case object. The Case Wrap-up process classifies structured fields using case data (e.g., case database object fields) and case-related text data such as live chat transcripts or the case feed. The auxiliary related text data is sanitized and joined with the case data to train models to recommend field values for the case database object fields required to close the case based in other fields of the case database record of interest, such as, for example, the case reason field, the case type field, and the case status field. Related records such as linked web pages or articles may also be analyzed along with other free form text such as case summary notes.

FIG. 5 depicts an exemplary chat messaging GUI display 500 depicting a chat messaging session pertaining to a case between an agent and a client. In some embodiments, the chat messaging GUI display 500 is depicted using a widget or window-inside-browser-window in connection with an instance of a virtual application 428 provided to each of the client device 302, 440 and the agent device 304, 440 via respective instances of browser applications 320, 442 executing thereon. If the Case Wrap-up process is enabled and configured for the agent (or the agent's tenant), when the chat messaging session is completed, the chat messaging data along with any other new auxiliary data associated with the case may be uploaded or otherwise provided by the browser application 320, 442 at the agent device 304, 440 to the server system 306, 402 along with a request to a recommendation engine at the server system 306, 402 (e.g., prediction module 103) to initiate or otherwise perform an updated automated wrap-up of the case. The prediction module 103 analyzes the content of the chat messaging data along with one or more fields of the case database record to generate recommended values for one or more fields of the case database record (which may be different from or include one or more of the fields input to the predictive model 104). The recommended field values may be stored or otherwise maintained in a database 107, 430 in association with the case database record for subsequent presentation to the agent or other user subsequently reviewing the case database record.

Figure 6:
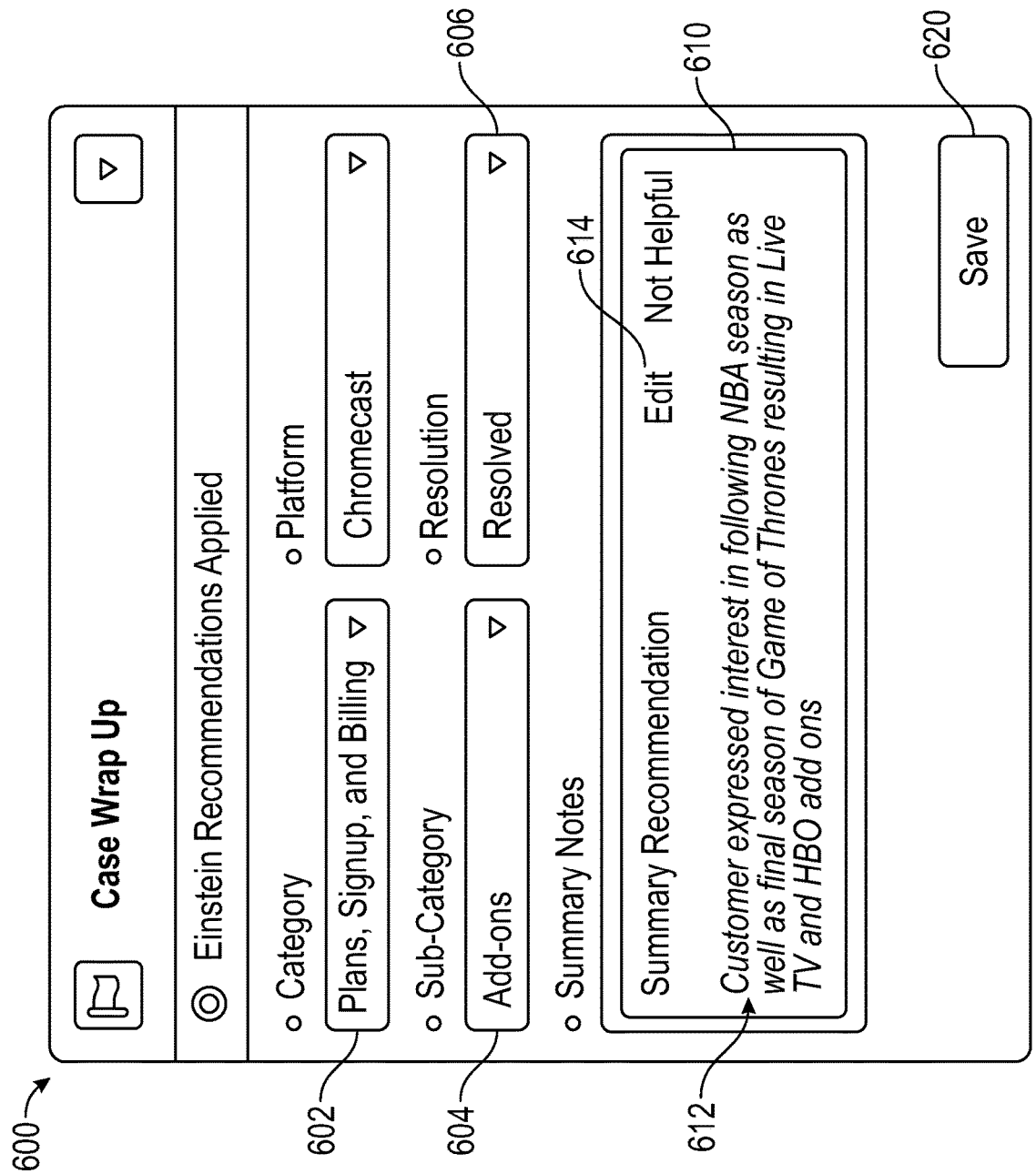
FIG. 6 depicts an exemplary case wrap-up GUI display that may be presented in connection with the subject matter described herein in accordance with one or more embodiments.

FIG. 6 depicts an exemplary case wrap-up GUI display 600 that may be presented in connection with the subject matter described herein that reflects the chat messaging data depicted in the chat messaging GUI display 500. The case wrap-up GUI display 600 may be presented by an instance of a virtual application 428 within a browser application 320, 442 at an agent device 304, 440 in response to termination of a chat messaging session pertaining to the case database record that corresponds to the content of the case wrap-up GUI display. In connection with the Case Wrap-up process, the prediction module 103 at the server system 306, 402 analyzes the chat messaging data and other auxiliary data associated with the case along with one or more fields of the case database record to predict or otherwise generate recommended field values for the case database record, such as, for example, a recommended resolution status field value (e.g., "Resolved"), a recommended case category field value (e.g., "Plans, Signup, and Billing"), a recommended case sub-category field value (e.g., "Add-ons"), and/or the like. In this regard, the GUI elements 602, 604, 606 corresponding to those predicted fields may be automatically configured to initially indicate the predicted or recommended values for those respective fields. Additionally, in some embodiments, based on the chat messaging data or other auxiliary data such as a case feed, the prediction module 103 at the server system 306, 402 may automatically generate recommended summary notes and provide a corresponding graphical representation of the recommended summary notes field value, which in the illustrated embodiment is a text string that reflects the substance of conversation derived or otherwise determined using the chat messaging data. The case wrap-up GUI display 600 may include GUI elements that allow the agent to accept or modify the recommended field values. For example, the recommended summary notes field value 612 may be presented using a text box GUI element 610 within which the agent may select and edit the recommended summary notes string to add or remove words or perform other conventional text editing operations (e.g., copy, paste, etc.).

In exemplary embodiments, the Case Wrap-up process is automatically performed in response to updates associated with a case database record during the lifecycle of the case. For example, each time there is a chat messaging session associated with a case, the Case Wrap-up process may be performed to analyze the most recent chat messaging data to dynamically update the recommended case field values. For example, based on the more recent chat messaging data, the prediction module 103 at the server system 306, 402 may generate updated recommended summary notes that differ from those previously generated to reflect the substance or content of the most recent agent-customer interaction.

Figure 7:
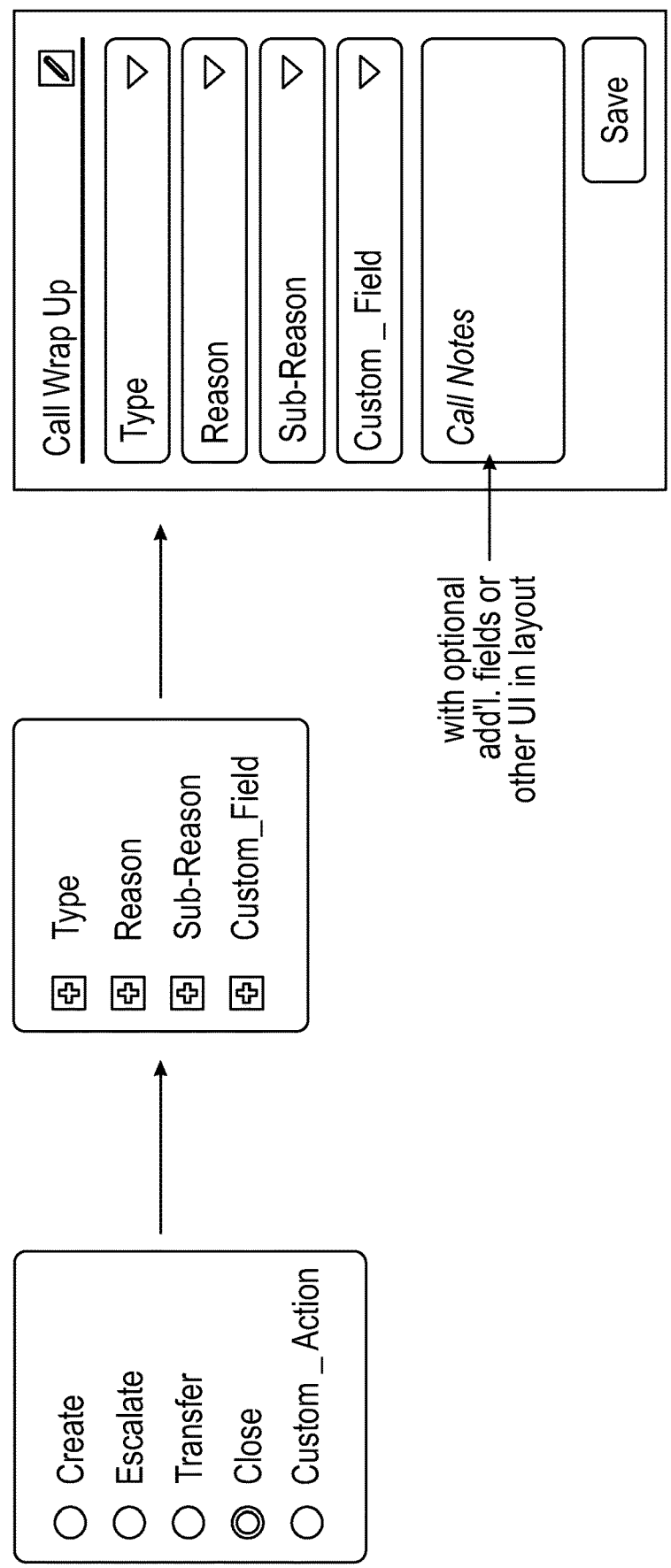
FIG. 7 depicts an exemplary GUI display sequence for configuring the Case Wrap-up process described herein in accordance with one or more embodiments.

In some embodiments, the fields that are predicted and have corresponding recommendations vary based on the current stage in the case lifecycle. For example, when a case is closed, a different set of fields may be recommended for updating versus when the case is escalated or transferred. In this regard, FIG. 7 depicts an exemplary GUI display sequence for configuring the Case Wrap-up process to vary depending on the current stage in the case lifecycle. For example, when the Case Wrap-up process is initiated or otherwise performed, the Case Wrap-up process may identify or otherwise determine the type of action that triggered the Case Wrap-up process (e.g., closing the case, escalation of the case, transfer of the case, etc.). Based on the type of action with respect to the case that triggered the Case Wrap-up process, the Case Wrap-up process identifies the fields of the case database object to be predicted. For example, in the illustrated embodiment of FIG. 7, the type, reason, sub-reason, and a custom field for the case database object are designated for prediction. Accordingly, the prediction module 103 at the server system 306, 402 may obtain the predictive models 104 for those case database object fields associated with the identified type of triggering action, and then apply those predictive models 104 to the new or updated auxiliary data (e.g., chat messaging data, case feed, etc.) to generate recommended field values for those fields. In some embodiments, the Case Wrap-up process only generates recommended field values for the identified fields associated with the triggering action without generating predictions or recommendations for any other fields. Thereafter, a GUI display may be provided that indicates the recommended field values for those fields designated for updating with the identified triggering action.

Figure 8:
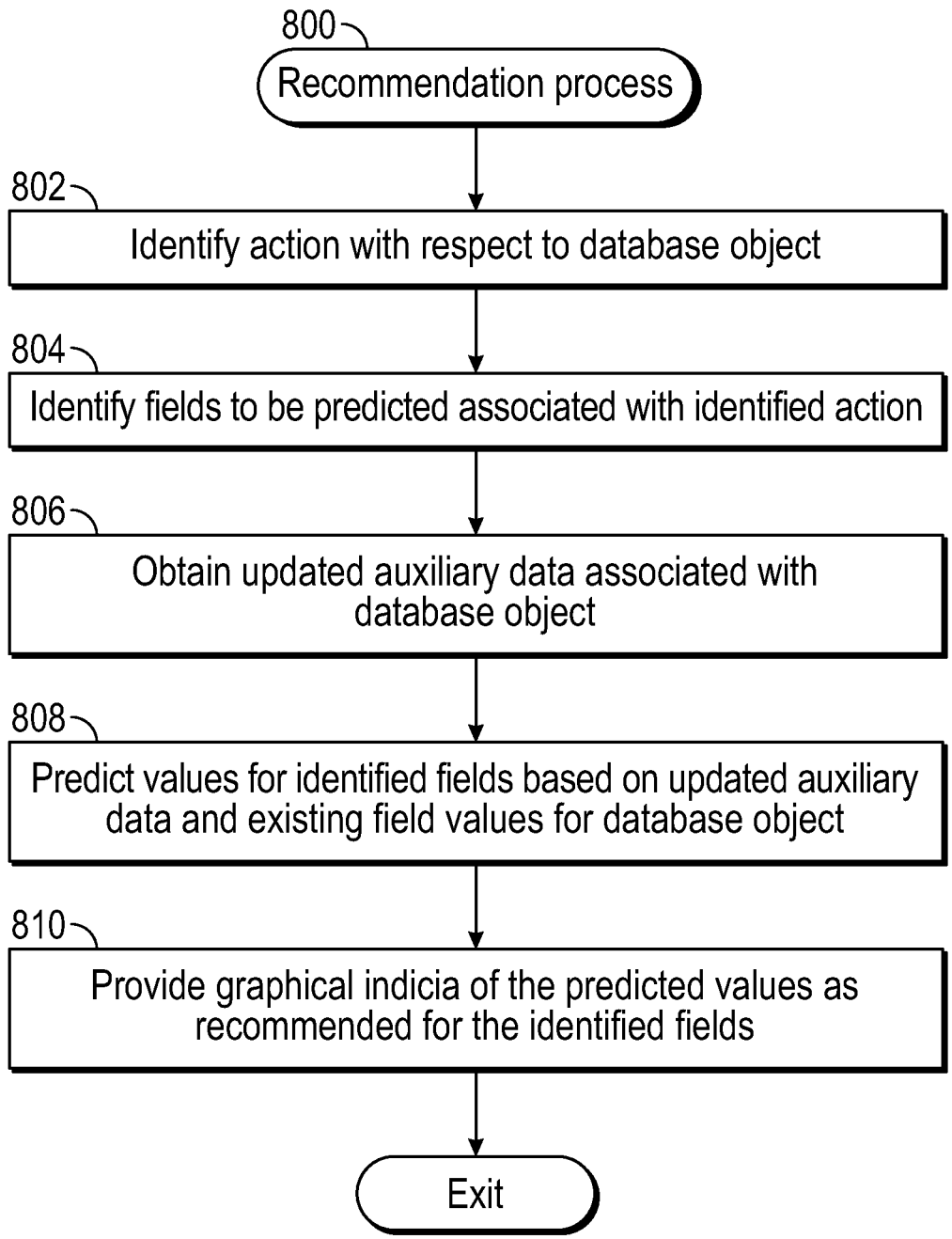
FIG. 8 is a flow chart of a recommendation process that may be implemented by one or more of the systems of FIGS. 1 and 3-4 in accordance with one or more embodiments.

FIG. 8 depicts an exemplary embodiment of a recommendation process 800 suitable for implementation by one of the systems 100, 300, 400 described herein. For illustrative purposes, the following description may refer to elements mentioned above in connection with FIGS. 1-7. It should be appreciated that the recommendation process 800 may include any number of additional or alternative tasks, the tasks need not be performed in the illustrated order and/or the tasks may be performed concurrently, and/or the recommendation process 800 may be incorporated into a more comprehensive procedure or process having additional functionality not described in detail herein. Moreover, one or more of the tasks shown and described in the context of FIG. 8 could be omitted from a practical embodiment of the recommendation process 800 as long as the intended overall functionality remains intact.

The recommendation process 800 identifies or otherwise determines the type of action with respect to a database object that triggered the recommendation process 800 (task 802). In one embodiment, the type of action is indicated by a change to a status field associated with the database object (e.g., a status field for a case database record changing from "open" to "escalated"). For example, a prediction system 101 may be implemented by or at a server system 306, 402 that periodically or continually monitors for changes to database records or objects while providing instances of a virtual application 428 to client devices 302, 440 that allow users to create, edit, view, or otherwise access database records maintained in the database 430. In this regard, a web browser or similar local client application executed at the client device 302, 440 may be utilized to contact an application platform 420 at the server system 306, 402 and access or otherwise retrieve a computer file, such as a HyperText Markup Language (HTML) file, corresponding to a web page that is generated by the application platform 420 as part of an instance of a virtual application 426 generated at run-time (or "on-demand") based at least in part on data stored or otherwise maintained by the database 430. For example, as described above, the server systems 306, 402 may provide a CRM application that allows a customer service agent or other user to interact with case database object records, triage cases, and the like. In this regard, in response to detecting a particular action with respect to a case database record (e.g., a customer service agent changing a status of the case or performing some other action with respect to the case), the server system 306, 402 may automatically detect the action and trigger the recommendation process 800 and/or the prediction system 101 with respect to that case database record.

Based on the type of triggering action, the recommendation process 800 identifies or otherwise determines which fields are to be predicted for the database object (task 804). For example, when the action that triggered the recommendation process 800 is a customer service agent transferring the case to another agent, the recommendation process 800 may identify or otherwise determine a summary field should be predicted to summarize the previous agent's interaction with the customer to facilitate the new agent understanding the current status and resuming interaction with the customer. As another example, when the action that triggered the recommendation process 800 is a customer service agent closing the case, the recommendation process 800 may identify or otherwise determine a classification field for the case should be predicted to facilitate grouping the case database record with other similar case database records.

Thereafter, the recommendation process 800 retrieves or otherwise obtains updated auxiliary data associated with the database object and then generates or otherwise determines recommended values for the identified fields based at least in part on the updated auxiliary data (tasks 806, 808). For example, as described above, chat messaging data or other conversational data associated with a case database object may be obtained and analyzed in connection with one or more existing values for one or more fields of the case database object to generate a recommended summarization of correspondence associated with the case database object. Additionally, or alternatively, the conversational data associated with a case database object may be obtained and analyzed in connection with one or more existing values for one or more fields of the case database object to generate a recommended classification or state for a particular structured field associated with the case database object. As described in greater detail below in the context of FIG. 9, the chat messaging data may be divided into smaller chunks or segments that are then fed into an encoder model on a per-chunk or per-segment basis to obtain a corresponding representation of the respective chunk or segment. The final set of representations for the constituent segments may then be combined using a machine learning technique, such as mean pooling, max pooling, feed forward neural network, or the like to obtain a combined representation of the chat messaging data. The combined representation may then be input to a higher-level characterization model, such as a summarization model or a classification model (or classifier). For example, a summarization model generates an automated and predicted summarization of the content of chat messaging data for autopopulating an unstructured field, such as a summary field, potentially using one or more fields of the database object to which the chat messaging data pertains. A classification model generates a recommended or predicted classification of the case database record corresponding to one of a plurality of potential structured field values to be associated with the case database record based on the chat messaging content indicated by the combined representation and potentially one or more fields of the case database record.

Thereafter, the recommendation process 800 continues by generating or otherwise providing graphical indicia of the recommended values for the identified fields for the database object (task 810). For example, a GUI display corresponding to the case database record may be provided within the instance of the virtual application 428, with the GUI display including a GUI element (e.g., a text box, drop-down menu, radio button, or the like) that corresponds to the particular field being predicted. In this regard, the GUI element may be automatically populated or otherwise configured automatically to indicate the predicted or recommended value for that field that was generated based on the conversational data associated with the case database record. For example, a text box 610 for a summary field associated with the case database record may be automatically populated with a recommended summarization 612 of the conversational data, as depicted in FIG. 6. A user may review or otherwise analyze the recommended values before confirming or otherwise authorizing updating those fields of the database object to store the recommended values in the database. For example, a user may select a hyperlink or similar GUI element 614 to enable editing the value of the summary field, or alternatively select a button or similar GUI element 620 to confirm the autopopulated predicted value 612 for the summary field to persistently maintain the autopopulated predicted value for the summary field of the case database record in the database. Similarly, GUI elements 602, 604, 606 associated with structured fields may be automatically configured to indicate the recommended or predicted classifications for those respective structured fields, with the user then being able to manipulate the GUI elements 602, 604, 606 to modify the values or select another GUI element 620 to confirm and save the selected values for those fields of the case database record.

Figure 9:
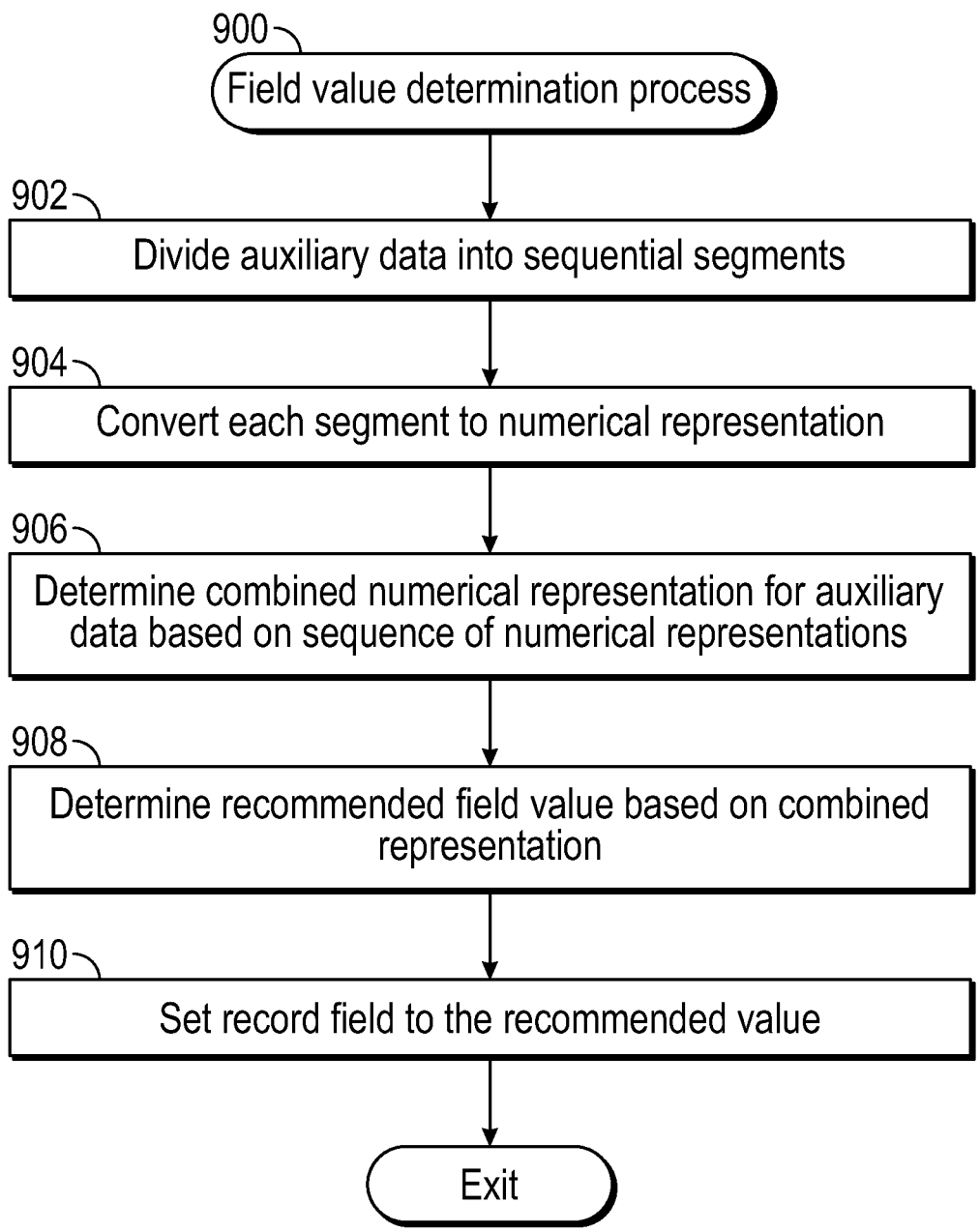
FIG. 9 is a flow chart of a field value determination process that may be performed in connection with the recommendation process of FIG. 8 in accordance with one or more embodiments.
Figure 10:
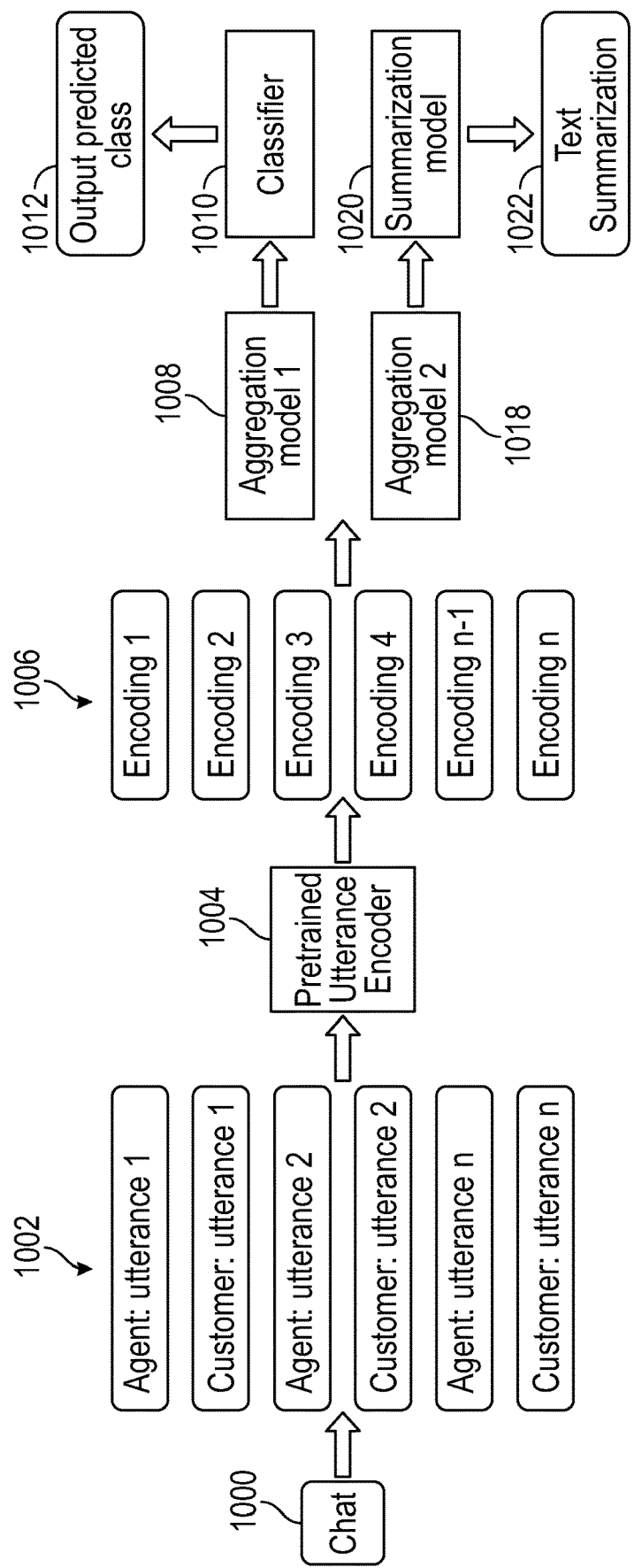
FIG. 10 is a block diagram of an exemplary field prediction system suitable for implementing the field value determination process of FIG. 9 in connection with the recommendation process of FIG. 8 in accordance with one or more embodiments.

FIG. 9 depicts an exemplary embodiment of a field value determination process 900 suitable for implementation in connection with the recommendation process 800 of FIG. 8 (e.g., task 808) to predict recommended values for unstructured or structured fields as a function of auxiliary data associated with a database record. For illustrative purposes, the following description may refer to elements mentioned above in connection with FIGS. 1-7. It should be appreciated that the field value determination process 900 may include any number of additional or alternative tasks, the tasks need not be performed in the illustrated order and/or the tasks may be performed concurrently, and/or the field value determination process 900 may be incorporated into a more comprehensive procedure or process having additional functionality not described in detail herein. Moreover, one or more of the tasks shown and described in the context of FIG. 9 could be omitted from a practical embodiment of the field value determination process 900 as long as the intended overall functionality remains intact.

The field value determination process 900 is initiated or otherwise performed after obtaining new or updated auxiliary data associated with a database record (e.g., task 806). The field value determination process 900 begins by dividing or segmenting the auxiliary data into multiple different smaller segments or chunks (task 902). For example, the chat messaging data or other conversational data associated with a database record may be divided into a number of segments on a per-sentence basis, a per-utterance basis, a per-speaker basis, and/or the like to obtain a plurality of constituent segments for the conversational data. As used herein, an utterance should be understood as a discrete uninterrupted chain of language provided by an individual speaker. For example, in a chat messaging or text messaging context, each separate and discrete message that originate from a particular speaker constitutes an utterance. Thus, for analysis on a per-utterance basis, sequential but separate messages from the same speaker may be divided into a different segment for each message. Conversely, for analysis on a per-speaker basis, separate messages from the same speaker may be consolidated into an individual segment. In this regard, the subject matter described herein is not intended to be limited to any particular scheme or manner for segmenting conversational data, and in practice, the manner in which conversational data is segmented may vary to optimize model performance (e.g., accuracy, reliability, and/or the like). In exemplary embodiments, the temporal relationships between segments is maintained to provide a sequence of segments that reflect the temporal and logical relationships for each segment with respect to its preceding or succeeding segments.

After dividing the auxiliary data into smaller segments, the field value determination process 900 continues by translating, transforming, or otherwise converting the textual content of each respective segment into a corresponding numerical representation (task 904). In this regard, the text that makes up each segment is effectively encoded into a corresponding numerical value that represents the content of that segment. In exemplary embodiments, the text or string data that makes up the segment is input or otherwise provided to an encoder model that maps, converts, or otherwise calculates a corresponding numerical value for the input segment. As described above, the encoder model may be derived using machine learning or other artificial intelligence techniques. For example, in a similar manner as described above in the context of FIG. 1, the model generation module 106 may be configured to analyze a pre-existing data set of reference objects in the repository 107 for relationships between the user selected fields and content in the objects in the data set (e.g., content in the title and body of message objects) to train and derive, based on the analysis, a predictive model 104 to predict a numerical value from an input text string. For example, as described above, the model generation model 106 may analyze the relationship between numerical representations of conversational data associated with a reference set of database records maintained in the repository 107 (e.g., on a per-sentence basis, a per-utterance basis, or a per-speaker basis) and the respective values for a particular field of the respective database records to derive a encoder model for converting a numerical vector representation of a conversational segment into an encoded value that is correlative to the value for that particular field. In this manner, the output of the encoder model may effectively represent the overall content of each discrete sentence or correspondence by a respective speaker. Converting each conversational text segment by a respective speaker into a numerical value results in a sequence of numerical values that represent the components of the correspondence associated with the database record. In some embodiments, the encoder model may map substantially similar conversational segments, that is, segments having substantially the same meaning, to substantially the same encoded value to reduce the impact of linguistic idiosyncrasies.

After obtaining a sequence of numerical representations corresponding to the auxiliary data, the field value determination process 900 continues by determining a combined numerical representation of the auxiliary data as a function of the sequence of numerical representations (task 906). In one or more embodiments, the sequence of numerical values is input or otherwise provided to an aggregation model that maps or otherwise converts the sequence of numerical values to a singular numerical value that represents the sequence. Depending on the embodiment, the aggregation model may be field-specific or nonspecific, similar to the encoder model as described above. For a field-specific implementation (such as depicted in FIG. 10), machine learning or other artificial intelligence techniques may be utilized to derive the aggregation model based on the relationship between the sequence of encoded numerical representations of conversational data and the respective values for a particular field of the respective database records to derive an aggregation model for converting a sequence of encoded values into an aggregate value that is correlative to the value for that particular field In this manner, the aggregation model may synthesize a sequence of encoded values corresponding to conversational segments by different speakers into an aggregate or combined numerical representation of the entire correspondence with respect to the particular field of interest.

Still referring to FIG. 9, after determining a combined numerical representation of the auxiliary data, the field value determination process 900 determines a recommended field value based on the combined numerical representation (task 908). For example, in one or more embodiments, the combined numerical representation is input or otherwise provided to a summarization model that automatically generates a summary of the correspondence as a function of the combined numerical representation of the conversational data and potentially one or more fields of the database record. The summarization model may be derived using machine learning or other artificial intelligence techniques to arrive at the summarization model for generating a text string as a function of the combined numerical representation of the conversational data associated with the database record. Depending on the embodiment, the summarization model may be configured to provide an extractive summarization (e.g., an autogenerated summary produced by choosing a subset of sentences or segments of the conversational data) or an abstractive summarization (e.g., an autogenerated summary that recapitulates the conversational data without being constrained to selecting from sentences or segments of the conversational data).

For example, given a reference set of database records, the model generation model 106 may apply the encoder and aggregation models to the conversational data associated with the respective reference database records maintained in the repository 107 to obtain a combined numerical representation of the correspondence associated with each respective database record, and then analyze the relationship between the respective combined correspondence numerical representations associated with the respective reference database records and the respective values for a summary field of the respective database records to derive a model for classifying an aggregate representation of conversational data into a probable value for the summary field. In this regard, the output of the summarization model may be realized as probable words or sentences and their corresponding probabilities of being present in the summary field, which, in turn, may be utilized to automatically generate a sentence, paragraph, or other recapitulation using a subset of the most probable words. For example, in an extractive summarization model, the summarization model may output probable sentences and their corresponding probabilities, with the conversational data associated with the database record of interest then being analyzed to identify and select the potential combinations and/or sequences of sentences that are found within the conversational data to arrive at a recommended value for the summary field. For example, in one embodiment, the extractive summarization model is utilized to derive a topic or theme of the correspondence, with each potential sentence being scored and assigned an importance with respect to the identified topic or theme. A subset of a threshold number of sentences found within the conversational data for the database record of interest having the highest importance or score with respect to the extracted topic are selected and utilized to generate the recommended summary. Some embodiments may further analyze the potential combinations and sequences of the selected sentences to arrive at a recommended arrangement of the probable sentences that optimizes grammatical aspects of the recommendation (e.g., maximizing readability and/or the like).

Conversely, for an abstractive summarization model, the summarization model may identify probable words and their corresponding probabilities, where the potential combinations and sequences of the probable words are then analyzed to identify a grammatically correct or probable combination and sequence of probable words that maximizes or otherwise optimizes the probability across the combination. The abstractive summarization model may be realized as a recurrent neural network trained using reference summary field values from existing reference database records and their respective relationships to the combined numerical representations of the correspondence associated with the respective existing reference database records. In this manner, a recommended autogenerated summary value may be provided for an unstructured summary field of a database record based on historical values for the field from other database records.

Additionally, or alternatively, the combined numerical representation is input or otherwise provided to a classification model that automatically classifies a field associated with the database record into one of a plurality of potential field values as a function of the combined numerical representation of the conversational data and potentially one or more fields of the database record. The classification model may be derived using machine learning or other artificial intelligence techniques (e.g., random forest, logistic regression, neural networks, mean/max pooling, and/or the like) to arrive at the classification model for classifying a particular field of the database record as a function of the combined numerical representation of the conversational data associated with the database record in a similar manner as described above with respect to the summarization model. In this regard, the classification model outputs a probability of a particular state, class, category, or other predefined value for a structured field of a database record.

After mapping the combined numerical representation to a predicted or recommended field value, in the illustrated embodiment, the field value determination process 900 continues by automatically setting the predicted field of the database record to the predicted or recommended field value (task 910). For example, for a summary field, the field value determination process 900 may automatically update or otherwise modify the summary field of a case database record to include the recommended or predicted text string generated by the summarization model. Similarly, for a structured field, the field value determination process 900 may automatically update or otherwise modify that respective field of a case database record to indicate the recommended state or classification for that structured field that was predicted by the classification model. In this manner, the field value determination process 900 may automatically populate one or more fields of the database record based on the conversational data or other auxiliary data associated with the database record. Thereafter, when a GUI display is updated to provide a graphical representation of the database record, GUI elements associated with the predicted or recommended fields of the database record may be automatically populated for review by a user. In some embodiments, the autopopulated data may be flagged or otherwise marked with a conditional value to indicate the value is tentative prior to confirmation by a user.

FIG. 10 depicts an exemplary field prediction system suitable for implementation by a database system, a server system, or other computing system in connection with the recommendation process 800 of FIG. 8 and/or the field value determination process 900 of FIG. 9. FIG. 10 depicts a scenario where chat messaging data 1000 associated with a database record is initially divided or segmented into multiple different segments 1002 on a per-speaker or per-utterance basis (e.g., task 902). Each segment 1002 is input or otherwise provided to an encoder model 1004 that generates a corresponding numerical representation 1006 (e.g., task 904). The sequence of numerical representations 1006 corresponding to the utterances that make up the chat messaging data 1000 is input or otherwise provided to one or more additional prediction models that generate a recommended field value as a function of the sequence of numerical representations 1006. For example, referring to FIG. 5, an utterance by a customer (e.g., "Ok thanks. That's more than I thought. Is there any discount?") may be encoded into a first numerical value (e.g., "Value 1"), with the following utterance by a customer service agent (e.g., "Yes! As a matter of fact, because this would be the first time that you choose these add-ons, you get the new sign-up discount. That would bring down your subscription cost to 19.99 per month. Would that work?") being encoded into a different numerical value (e.g., "Value 2"), and the following utterance by the customer (e.g., "That sounds like a deal. I'll get it.") being encoded into another numerical value (e.g., "Value 3"), where numerical values are maintained in sequential order and input or otherwise provided to a subsequent model.

For example, referring again to FIG. 10 with reference to FIGS. 5 and 9, for a structured field, the sequence of numerical representations 1006 may be input or otherwise provided to a first aggregation model 1008 associated with that structured field (e.g., task 906), which, in turn generates or otherwise determines a combined numerical representation of the sequence of numerical representations 1006 based on historical relationships between sequences of encoded values, corresponding field values for the structured field across a reference set of existing database records, and potentially other field values across a reference set of existing database records, as described above. The combined numerical representation generated by the aggregation model 1008 is input or otherwise provided to a classification model 1010 which classifies the input numerical value into a particular field value of a plurality of potential field values for the structured field (e.g., task 908), resulting in a predicted value 1012 for the structured field. In this regard, the classification model 1010 maps the aggregate numeric representation of the correspondence to a set of probabilities, each of which corresponds to the likelihood that the predicted field corresponds to a particular category or state. The predicted structured field value 1012 may be utilized to automatically set a structured field GUI element on a wrap-up GUI display presented for the database record to a recommended state (e.g., a drop-down menu 602, 604, 606 on the case wrap-up GUI display 600).

For example, referring to FIGS. 5-6 and continuing the example described above, the sequence of encoded values 1006 (e.g., Value 1, Value 2, and Value 3 and any preceding or following numerical values) provided by the encoder model 1004 are input to the aggregation model 1008, which maps the sequence of values to a representative aggregate value. The aggregate value is input to the classification model 1010, which calculates or otherwise determines a recommended value for the resolution field as being "resolved" from among the potential values for the resolution field as a function of the aggregate value and potentially other fields of the case database record. The drop-down menu GUI element 606 corresponding to the resolution field may be automatically populated to indicate the recommended field value of "resolved," as depicted in FIG. 6.

As another example, for a case type field associated with a case database record, the individual back-and-forth segments of conversational data 1002 that make up the correspondence associated with that particular case may be encoded into a sequence of encoded values 1006 by an encoder model 1004, with the sequence of encoded correspondence values 1006 being input to an aggregation model 1008 trained for the case type field to arrive at an aggregate numerical representation that is then provided to a classifier model 1010 that identifies a recommended state or value 1012 for the case type field from among the potential states or values for the case type field. A graphical representation of that case database record may then be updated to graphically depict the recommended state for the case type field, for example, by automatically setting a selected value of a picklist or other GUI element associated with the case type field to indicate the recommended state.

Referring again to FIG. 10 with reference to FIGS. 5-6 and 9, additionally, or alternatively, for an unstructured field, the sequence of numerical representations 1006 may be input or otherwise provided to a second aggregation model 1018 associated with the unstructured field (e.g., task 906), which, in turn generates or otherwise determines a combined numerical representation of the sequence of numerical representations 1006. The combined numerical representation generated by the aggregation model 1018 is input or otherwise provided to a summarization model 1020 which generates a summarization or characterization of the input numerical value, resulting in a predicted summary value 1022 for the unstructured field. The predicted summary value 1022 may be utilized to automatically populate a summary field GUI element on a wrap-up GUI display presented for the database record (e.g., text box 610 of the case wrap-up GUI display 600). For example, a case reason field associated with a case database record, the sequence of encoded correspondence values 1006 being input to an aggregation model 1008 trained for the case reason field to arrive at an aggregate numerical representation that is then provided to a summarization model 1020 that automatically generates a recommended value 1012 for the case reason field (e.g., using extractive or abstractive modeling as described above). A graphical representation of that case database record may then be updated to graphically depict the recommended state for the case type field, for example, by automatically populating a text box or other GUI element associated with the case reason field to include the autogenerated summary of the reason associated with the particular case.

For example, referring to FIGS. 5-6, the different utterances of the conversation depicted in FIG. 5 are mapped to a sequence of numerical values 1006 by the encoder model 1004, as described above. The aggregation model 1018 maps the sequence of numerical values 1006 to a corresponding numerical value based on historical relationships between sequences of encoded values, corresponding field values for the unstructured field, and potentially other field values across a reference set of existing database records, as described above. The aggregated value is input or otherwise provided to the summarization model 1020, which generates a recommended summary value for the conversation depicted in FIG. 5. The recommended summary value is then utilized to automatically populate the summary field text box 610 on the case wrap-up GUI display 600.

Referring again to FIGS. 8-9, in exemplary embodiments, the recommendation process 800 and field value determination process 900 are performed more than one time during the lifecycle of a case to dynamically update the recommended field values to reflect more recent conversational data associated with the case. In this regard, as more conversational data becomes available and/or the values for other fields of the case change over time, the autogenerated summarizations or classifications for different fields of the case may dynamically change to reflect the changing status of the case.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, machine learning, artificial intelligence, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although a schematic shown in a drawing figure may depict one exemplary arrangement of elements, additional intervening elements, devices, features, or components may be present in a practical embodiment of the depicted subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of providing a recommended value for an unstructured field of a database object, the method comprising:
   obtaining correspondence associated with the database object, wherein the correspondence comprises a plurality of utterances by different speakers;
   segmenting the correspondence into a plurality of conversational segments, wherein at least one conversational segment of the plurality of conversational segments includes textual content comprising an utterance of the plurality of utterances by a respective speaker of the different speakers;
   for one or more of the plurality of conversational segments, encoding the textual content of the respective conversational segment comprising the utterance by the respective speaker into an encoded value representing the overall content of the respective conversational segment as a function of the textual content by inputting a text string corresponding to the respective conversational segment into an encoder model configured to generate the encoded value for the respective conversational segment as a function of the text string, resulting in a sequence of encoded values corresponding to the plurality of conversational segments of the correspondence;
   generating a combined numerical representation of the correspondence based on the sequence of encoded values by inputting the sequence of encoded values to an aggregation model;
   generating the recommended value for the unstructured field of the database object based on the combined numerical representation of the correspondence using a prediction model associated with the unstructured field, wherein the recommended value comprises a recommended summarization of the correspondence; and
   autopopulating the unstructured field of the database object with the recommended value.

2. The method of claim 1, wherein segmenting the correspondence comprises dividing chat messaging data on a per-utterance basis and each conversational segment of the plurality of conversational segments corresponds to a respective utterance of the chat messaging data.

3. The method of claim 1, wherein the unstructured field comprises one of a summary field, a status field, or another field summarizing activity during a lifecycle of the database object.

4. The method of claim 1, wherein the correspondence includes at least one of chat messaging data, a feed, and an e-mail thread.

5. The method of claim 1, further comprising determining the aggregation model using historical values for the unstructured field of a reference set of existing database objects.

6. The method of claim 5, wherein generating the recommended value comprises inputting the combined numerical representation into a summarization model configured to generate the recommended value as a function of the combined numerical representation, wherein the summarization model is derived using the historical values for the unstructured field of the reference set of existing database objects.

7. The method of claim 1, wherein generating the recommended value comprises inputting the combined numerical representation into a summarization model configured to generate the recommended value as a function of the combined numerical representation.

8. The method of claim 1, wherein generating the recommended value comprises inputting the combined numerical representation into an extractive summarization model configured to generate the recommended value as a function of the combined numerical representation by identifying and selecting a subset of the correspondence associated with the database object that is correlative to an extracted topic identified using the combined numerical representation.

9. The method of claim 1, wherein generating the recommended value comprises inputting the combined numerical representation into an abstractive summarization model configured to generate the recommended value as a function of the combined numerical representation based on historical relationships between historical values for the unstructured field of a reference set of existing database objects and corresponding combined numerical representations of the reference set of existing database objects.

10. A computing system comprising:
    a database to maintain a database object; and
    a server coupled to the database and a network to obtain correspondence associated with the database object, wherein the correspondence comprises a plurality of utterances by different speakers, segment the correspondence into a plurality of conversational segments prior to determining a numerical sequence of encoded values corresponding to the plurality of conversational segments using an encoder model as a function of textual content of the plurality of conversational segments, wherein at least one conversational segment of the plurality of conversational segments includes textual content comprising an utterance of the plurality of utterances by a respective speaker of the different speakers and determining the numerical sequence of encoded values comprises inputting a text string corresponding to a respective conversational segment into the encoder model configured to generate the encoded value for the respective conversational segment as a function of the text string, convert the numerical sequence of encoded values into a combined numerical representation using an aggregation model by inputting the sequence of encoded values to the aggregation model, and determine a recommended value for a field of the database object based on the combined numerical representation, wherein the recommended value comprises a recommended summarization of the correspondence, and set the field of the database object to the recommended value.

11. The computing system of claim 10, wherein the server generates a graphical indication of the recommended value for the field within a graphical user interface display associated with an instance of an application provided to a client device over the network.

12. The computing system of claim 10, wherein:
the correspondence includes at least one of chat messaging data, a feed, and an e-mail thread;
the field comprises an unstructured field; and
the recommended value comprises an autogenerated summary of the correspondence determined as a function of the combined numerical representation using a summarization model.

13. The computing system of claim 10, wherein:
the correspondence includes at least one of chat messaging data, a feed, and an e-mail thread;
the field comprises a structured field; and
the recommended value comprises an identified value from among a plurality of potential values for the structured field determined based on the combined numerical representation using a classification model.

14. A non-transitory computer-readable medium having instructions stored thereon that, when executed by a processing system, cause the processing system to:
obtain correspondence associated with a database object, wherein the correspondence comprises a plurality of utterances by different speakers;
segment the correspondence into a plurality of conversational segments, wherein at least one conversational segment of the plurality of conversational segments includes textual content comprising an utterance of the plurality of utterances by a respective speaker of the different speakers;
for one or more of the plurality of conversational segments, encode the textual content of the respective conversational segment comprising the utterance by the respective speaker into an encoded value representing the overall content of the respective conversational segment as a function of the textual content by inputting a text string corresponding to the respective conversational segment into an encoder model configured to generate the encoded value for the respective conversational segment as a function of the text string, resulting in a sequence of encoded values corresponding to the plurality of conversational segments of the correspondence;
generate a combined numerical representation of the correspondence based on the sequence of encoded values by inputting the sequence of encoded values to an aggregation model;
generate a recommended value for an unstructured field of the database object based on the combined numerical representation of the correspondence using a prediction model associated with the unstructured field, wherein the recommended value comprises a recommended summarization of the correspondence; and
autopopulate the unstructured field of the database object with the recommended value.

15. The computer-readable medium of claim 14, wherein the instructions cause the processing system to segment the correspondence by dividing chat messaging data on a per-utterance basis and each conversational segment of the plurality of conversational segments corresponds to a respective utterance of the chat messaging data.

16. The computer-readable medium of claim 14, wherein the unstructured field comprises one of a summary field, a status field, or another field summarizing activity during a lifecycle of the database object.

17. The computer-readable medium of claim 14, wherein the correspondence includes at least one of chat messaging data, a feed, and an e-mail thread.

18. The computer-readable medium of claim 14, wherein the instructions cause the processing system to determine the aggregation model using historical values for the unstructured field of a reference set of existing database objects.

19. The computer-readable medium of claim 14, wherein the instructions cause the processing system to generate the recommended value by inputting the combined numerical representation into an extractive summarization model configured to generate the recommended value as a function of the combined numerical representation by identifying and selecting a subset of the correspondence associated with the database object that is correlative to an extracted topic identified using the combined numerical representation.

20. The computer-readable medium of claim 14, wherein the instructions cause the processing system to generate the recommended value by inputting the combined numerical representation into an abstractive summarization model configured to generate the recommended value as a function of the combined numerical representation based on historical relationships between historical values for the unstructured field of a reference set of existing database objects and corresponding combined numerical representations of the reference set of existing database objects.

* * * * *